US012725384B2

(12) United States Patent
Fraz et al.

(10) Patent No.: US 12,725,384 B2
(45) Date of Patent: Sep. 1, 2026

(54) METHOD AND APPARATUS FOR PROVIDING FEEDBACK TO A USER INPUT

(71) Applicant: Dyson Technology Limited, Wiltshire (GB)

(72) Inventors: Muhammad Fraz, Swindon (GB); Charles Anthony Neild Collis, Bath (GB)

(73) Assignee: Dyson Technology Limited, Malmesbury (GB)

( * ) Notice: Subject to any disclaimer, the term of this patent is extended or adjusted under 35 U.S.C. 154(b) by 645 days.

(21) Appl. No.: 18/021,708

(22) PCT Filed: Sep. 6, 2021

(86) PCT No.: PCT/GB2021/052283
§ 371 (c)(1),
(2) Date: Feb. 16, 2023

(87) PCT Pub. No.: WO2022/053787
PCT Pub. Date: Mar. 17, 2022

(65) Prior Publication Data

US 2023/0306705 A1 Sep. 28, 2023

(30) Foreign Application Priority Data

Sep. 8, 2020 (GB) ..................................... 2014086

(51) Int. Cl.
*G06V 10/141* (2022.01)
*G06F 3/01* (2006.01)
*G06F 3/16* (2006.01)

(52) U.S. Cl.
CPC ............ *G06V 10/141* (2022.01); *G06F 3/017* (2013.01); *G06F 3/167* (2013.01)

(58) Field of Classification Search
USPC ...... 382/100–159; 704/1–275; 706/900–911, 706/1–62
See application file for complete search history.

(56) References Cited

U.S. PATENT DOCUMENTS 6,297,804 B1 10/2001 Kashitani
2009/0267895 A1 10/2009 Bunch
(Continued)

FOREIGN PATENT DOCUMENTS

CN 107111979 A 8/2017
JP 2000056896 A 2/2000
(Continued)

OTHER PUBLICATIONS

Ambrus, A; With Three Auxiliary Object Placed In Three-dimensional Visualization System; 2017 (Year: 2017).*
(Continued)

*Primary Examiner* — Marcellus J Augustin
(74) *Attorney, Agent, or Firm* — Tucker Ellis LLP

(57) ABSTRACT

A computer implemented method for providing feedback to a user input. The method includes obtaining data representing a scene model derived from scene data representing a scene in real space; obtaining data representing a user input identifying a first portion of the scene in real space; estimating, based on the user input data, a first position within the scene model corresponding to the first portion of the scene; determining control information for controlling a light source to direct light at or near a second position in real space corresponding to the first position within the scene model; and outputting the control information to control a light source, thereby to provide for feedback to the user input. The method may be implemented by a robot.

21 Claims, 9 Drawing Sheets

(56) References Cited

U.S. PATENT DOCUMENTS

| | | | | |
|---|---|---|---|---|
| 2013/0310652 | A1* | 11/2013 | Barsoum | H05B 47/105 600/249 |
| 2014/0139435 | A1 | 5/2014 | Bunch | |
| 2019/0340773 | A1* | 11/2019 | Cao | G06F 3/017 |
| 2020/0227034 | A1* | 7/2020 | Summa | G10L 15/22 |
| 2021/0255625 | A1* | 8/2021 | Baladhandapani | G10L 15/22 |

FOREIGN PATENT DOCUMENTS

| | | | |
|---|---|---|---|
| WO | 1999052070 | A1 | 10/1999 |
| WO | 2019069536 | A1 | 4/2019 |

OTHER PUBLICATIONS

Amahaya et al., “Spotlighting for guiding to articles on display.” 2015 IEEE 4th Global Conference on Consumer Electronics (GCCE), 2015, pp. 389-392.

International Search Report and Written Opinion received for PCT Patent Application No. PCT/GB2021/052283, mailed on Dec. 3, 2021, 12 pages.

Mann S., “Telepointer: Hands-free completely self-contained wearable visual augmented reality without headwear and without any infrastructural reliance.” Digest of papers. fourth international symposium on wearable computers, IEEE, 2000, pp. 177-178.

Search and Examination Report received for GB Application No. 2014086.9, mailed on Jun. 21, 2021, 6 pages.

Wilson et al., “Pointing in Intelligent Environments with the WorldCursor”, Human Computer Interaction, IFIP, 2003, pp. 495-502.

Wu Xueling et al., “Spatial Information Augmented Representation Using Affine Transformations for Virtual-Real Registration”, Jan. 21, 2010, 14 pages.

* cited by examiner 200
201
210
208
202
220
206
212
204
y
x
z

200'
201'
220'
206'
212'
y'
x'
z'

200
201
210
208
222
220
206
202
212
204
y
x
z

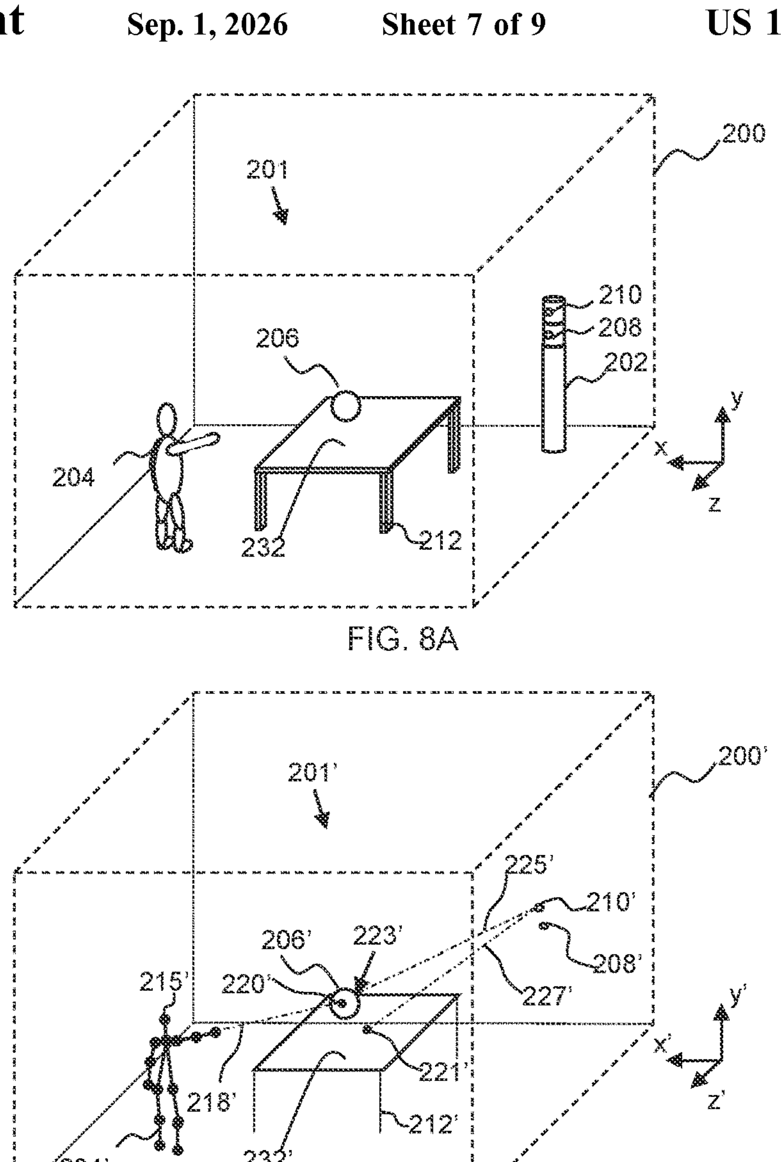
FIG. 8A
FIG. 8B
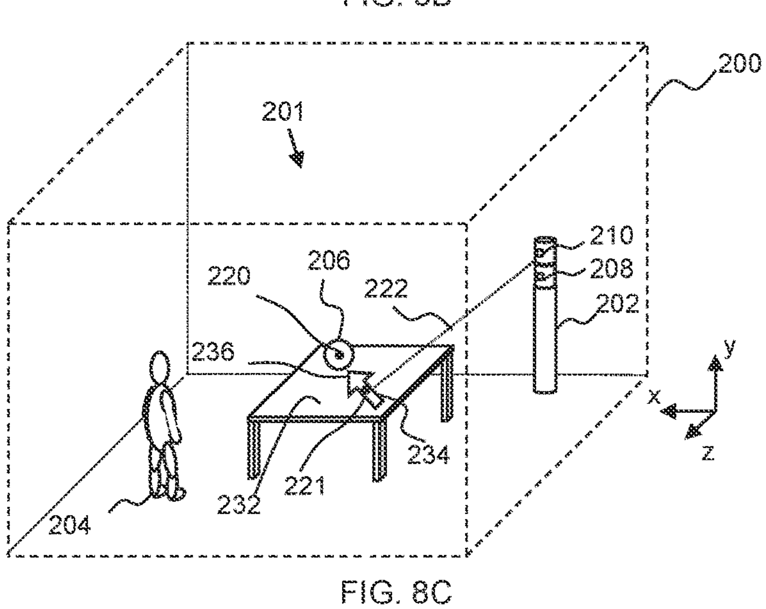
FIG. 8C

METHOD AND APPARATUS FOR PROVIDING FEEDBACK TO A USER INPUT

CROSS-REFERENCE TO PRIOR APPLICATION

This application is a § 371 National Stage Application of PCT International Application No. PCT/GB2021/052283 filed Sep. 6, 2021, which claims the priority of United Kingdom Application No. 2014086.9, filed Sep. 8, 2020, each of which are herein incorporated by reference in their entirety.

TECHNICAL FIELD

The present invention relates to providing feedback to a user input, and more particularly to computer implemented methods and apparatuses for providing feedback to a user input.

BACKGROUND

It is known that computers can be configured to perform tasks based on user input. Means have been developed for enabling user input to a computer. A known user input means is based on recognition of a pose or gesture of a user, as determined from an image of the user captured by a camera. However, interpretation by a computer of the user input can be imperfect. Accordingly, the user input as interpreted by the computer may be different from the user input as intended by the user. Actions taken by the computer based on incorrectly interpreted user input can waste resources and can lead to an inefficient user-computer interface or interaction.

A computer providing feedback to a user input is known in a limited and specific context. Specifically, it is known that movement of a computer mouse by a user produces corresponding movement of a cursor on a display screen of a computer. By displaying the cursor on the display screen, feedback as to the computer's interpretation of the user input is provided to the user. By providing this feedback, action taken on an incorrect interpretation of the user's input can be reduced, and hence an efficient user-machine interface can be provided. However, this known feedback mechanism is limited and inflexible. For example, it is only applicable to contexts in which the user input refers to a portion of a display screen of the computer.

It is desirable to provide effective computer feedback to a user input, and hence for an efficient and effective user-computer interface or interaction, that mitigates at least some of the limitations of the prior art.

SUMMARY

According to a first aspect of the present invention, there is provided a computer implemented method for providing feedback to a user input, the method comprising: obtaining data representing a scene model derived from scene data representing a scene in real space; obtaining data representing a user input identifying a first portion of the scene in real space; estimating, based on the user input data, a first position within the scene model corresponding to the first portion of the scene; determining control information for controlling a light source to direct light at or near a second position in real space corresponding to the first position within the scene model; and outputting the control information to control a light source, thereby to provide for feedback to the user input.

Outputting the control information to control the light source allows for the light source to direct light to the second position, and thereby allows for feedback to be provided to the user input. By this feedback, the user is informed of the computer's interpretation or understanding of the user input. Specifically, the user is informed of the computer's estimate of the first position within the scene model that corresponds to the first portion of the scene in real space identified by the user input. The user is therefore able to readily assess the computer's interpretation of the user input and, for example, whether this corresponds to the interpretation intended by the user. The occurrence of an action being taken by a computer based on an incorrect interpretation of the user's input can be therefore be reduced. An efficient user-machine interface or interaction can be provided for. Moreover, outputting the control information to control a light source to direct light at or near the second position in real space allows for the feedback to be provided in a clear and direct manner in the scene in real space. Effective feedback may therefore be provided for. Moreover, the feedback can be provided for a user input that refers to a portion of a scene in real space, rather than being limited to user input that refers to a portion of a display screen. Flexible feedback may therefore be provided for. In combination, efficient and effective user-computer interface or interaction is provided for.

Optionally, the user input data comprises data representing a physical gesture of the user.

The user input data comprising data representing a physical gesture of the user, such as a pointing gesture or the like, may provide for accurate and/or reliable identification of the first portion of the scene.

Optionally, the user input data comprises a vector or a sequence of vectors derived from a model of the user.

The user input data comprising a vector or sequence of vectors derived from a model of the user may allow for an accurate and/or reliable estimation of the first position within the scene model. The vector or vectors being derived from a model of the user may allow for the accurate and/or reliable estimation without necessarily encumbering the user with an input device or sensor. An improved user-computer interface or interaction may therefore be provided. The user input data comprising a sequence of vectors derived from a model of the user may allow for improved flexibility in the identification of the first portion of the scene and hence estimation of the first position within the model. For example, using the sequence of vectors may allow for the user input to correspond to a 'lassoing' and hence identification of one or a plurality of objects or regions of the scene and/or to define an extent of, as well as identify, a first portion such as a region of the scene in real space.

Optionally, the or each vector is a shoulder-to-wrist vector or a head-to-wrist vector derived from the model of the user.

The or each vector being a shoulder-to-wrist vector derived from the model of the user may allow for the consistent reproduction of the intention of a pointing or 'lasso' gesture of the user. For example, the shoulder-to-wrist vector is resilient to the extent to which a user's elbow may be bent, which may vary from user to user or from time to time for a given user. The vector being a head-to-wrist vector derived from the model of the user may allow for reasonably accurate reproduction of the intention of a pointing or 'lasso' gesture of the user, for example in cases where the shoulder-to-wrist vector is not determinable or is ambiguous.

Optionally, estimating the first position comprises: determining an object or region of the scene model intersected by the vector or encompassed by the sequence of vectors; and determining the first position based on a position of the object or region.

Determining an object or region of the model intersected by the vector or encompassed by the sequence of vectors, and then determining the first position based on the position of that object or region within the model, allows for an absolute and/or unambiguous feedback to be provided. For example, this may allow for light to be directed at or near a second position that corresponds to an object or region in the model estimated as being identified by a user input. The feedback may therefore be provided in a precise, unambiguous and absolute way with respect to objects or regions of the scene, for example as compared to if the second position was based only and/or directly on the vector.

Optionally, determining the first position and determining the control instructions, are responsive to a determination that the object or region of the scene model is intersected by the vector or encompassed by the sequence of vectors. This may allow for a 'snapping' type selection of objects or regions of the scene by a user, for example where the feedback to the user input is not provided unless and until it is determined that that user input corresponds to an object or region of the scene. This may provide for a clearer, less ambiguous, and more intuitive feedback to be provided.

Optionally, the user input data comprises data representing an utterance of the user.

The user input data comprising data representing an utterance of the user may allow for efficient processing of the user input and hence estimation of the first position. For example, this may be as compared to user skeleton modelling which can be resource intensive. In some examples, the data representing an utterance of the user may be used in combination with the other user input data, such as data representing a physical gesture of the user. The combination of the utterance data with other user data such as the gesture data may allow for improved accuracy, disambiguation, and/or for failsafe in the estimation of the first position within the scene model.

Optionally, the user input data comprises an identifier of an object or region derived from sound data representing the utterance of the user.

The user input data comprising an identifier of an object or region derived from sound data representing the utterance of the user may allow for the first position to be determined based on an object or region of the scene model, which may in turn may provide for precise, unambiguous and/or absolute feedback to be provided.

Optionally, estimating the first position comprises: mapping the identifier onto an object or region of the scene model; and determining a position of the object or region onto which the identifier is mapped as the first position.

This may allow for precise, unambiguous and/or absolute feedback to be provided. For example, this may allow for light to be directed at or near a second position that corresponds to an object or region in the model mapped onto the identifier in the user input. The feedback may therefore be provided in a precise, unambiguous and absolute way with respect to objects or regions of the scene, for example as compared to if the second position was determined based on a user input defining a position relative to some fixed origin position.

Optionally, determining the first position and determining the control instructions, are responsive to a determination that the identifier maps onto an object or region of the scene model. This may allow for a 'snapping' type selection of objects or regions of the scene by a user, for example where the feedback to the user input is not provided unless and until it is determined that that the user input corresponds or maps to an object or region of the scene. This may provide for a clearer, less ambiguous, and more intuitive feedback to be provided.

Optionally, the control information is determined based on data representing a third position within the scene model corresponding to a position of the user in real space.

Basing the control information additionally on a position within the scene model corresponding to a position of the user in real space may allow for the control information to be determined so as to control a light source such to direct light in a way that when it falls at or near the second position, it can be clearly viewed by the user. This may in turn provide for feedback to be more reliably and consistently delivered to the user. Alternatively, or additionally, this may in turn provide for improved flexibility in the possible relative orientations of the object/region, user, and light source for which feedback can be given.

Optionally, the control information is for controlling the light source to direct light at a fourth position in real space, at or near the second position, corresponding to a fifth position within the model, at or near the first position, and between which fifth position and the third position there is a clear line-of-sight.

This may help ensure that the user is able to see the feedback, that is the light falling at the fourth position in real space, regardless of the relative orientation of the object/region, user and light source, and/or taking into account any obstacles that might be between the object/region and the user. For example, if the light source for which the control instructions are determined is on the opposite side an object identified by the user input to the user, then the control instructions may be determined to control the light source to direct light at a fourth position near to the object but displaced at right angles to the user-object-light source axis, such that the user is able to see the light (or more specifically the reflection of the light) falling at the fourth position and hence receive the feedback. Accordingly, the feedback may be more reliably delivered.

Optionally, determining the control information comprises: when it is determined that there is a clear line-of-sight between the third position and the first position, determining control information for controlling the light source to direct light at the second position; and when it is determined that there is not a clear line-of-of sight between the third position and the first position, determining control information for controlling the light source to direct light at the fourth position.

Directing light at the second position in real space corresponding to the first position within the model may allow for light to be shone directly at the first portion identified by the user input, which may help provide for clear and unambiguous feedback. However, when it is determined that to do so would or might result in the user not being able to see that light (specifically the reflection thereof), then the light may be directed instead at the fourth position i.e. near the second position but for which it is determined that the user would be able to see the light (specifically the reflection thereof), and hence for feedback to be nonetheless reliably delivered. This may help provide that the clearest and most unambiguous form of feedback, given the specific relative orientations of the user, light source, and object/region at that time, is provided.

Optionally, the control information is for controlling the light source to project a symbol onto a first surface at or near the second position. For example, the control information may comprise data representing the symbol to be projected. A symbol may be defined as something used for or regarded as representing something else. The symbol may be an image, text, indicator, and/or marker.

The control information being for controlling the light source to project a symbol onto a first surface at or near the second position may allow for further information to be provided in the feedback, for example as compared to a laser point alone.

Optionally, the symbol is an animated symbol. For example, the symbol may be a dynamic or moving symbol, such as an animated or dynamic or moving image, text, indicator and/or marker.

The symbol being an animated symbol may provide for improved effective visibility of the symbol, for example as compared to a static symbol projected onto the first surface. This may provide for clearer feedback to be provided to the user.

Optionally, determining the control information comprises: determining an affine transformation to correct for an angle of incidence of a vector from a sixth position within the scene model to a second surface within the scene model, the sixth position corresponding to a position of the light source in real space, the second surface corresponding to the first surface in real space; and applying the affine transformation to the symbol to be projected onto the first surface.

The affine transformation may allow for the symbol, such as an image or text, to maintain a correct aspect ratio when projected onto the first surface, regardless of the relative positions of the light source and the first surface. This may provide for clear feedback to be provided reliably to the user.

Optionally, the symbol comprises an arrow, and wherein determining the control information comprises: determining a rotational transformation to orientate a point of the arrow towards the first position; and applying the rotational transformation to the arrow.

The rotational transformation may allow for an arrow to be projected on the first surface that points towards the first portion identified by the user input, regardless of the relative positions of the first portion and the first surface onto which the arrow is projected. object/region at the second and the position at which the image is projected. This may provide for clear feedback to be provided reliably to the user.

Optionally, the symbol comprises text, and wherein determining the control information comprises: determining a rotational transformation to orientate an axis of a line of the text parallel or at right angles to a vector from the third position to the first position; and applying the rotational transformation to the text.

The rotational transformation may allow for the text to be correctly orientated relative to the perspective of the user. This may allow for easier readability of the text by the user, and hence for clearer feedback to be provided for. The rotational transformation may orientate an axis of a line of the text parallel or at right angles to a vector from the third position to the first position for example when the text is to be read in a vertical or horizontal fashion, respectively, from the perspective of the user.

Optionally, the control information is for controlling the light source to direct light to outline a region in real space located at the second position.

This may allow for clear and unambiguous identification, in the feedback, of a region estimated to correspond to a region identified in the user input, and/or an extent of that region. This may alternatively or additionally allow for the clear and unambiguous identification, in the feedback, or a plurality of objects estimated to correspond to a plurality of objects or a region containing a plurality of objects identified in the user input.

Optionally, the control information comprises information for controlling actuation of one or more actuatable mirrors of a light source to direct a light beam at or near the second position.

This may allow for a fast and/or energy efficient control of the direction of light to the second position. For example, this may be as compared to moving an entire light source as a whole in order to direct the light. The actuation of mirrors to steer or direct a light beam may be fast enough to allow the tracing out of a symbol, whether static or animated, by the beam on a surface that appears to the user as though the symbol is projected as a whole onto the surface. In some examples, the light source comprises a laser, and the light beam may be a laser beam. Such control of the actuation of mirrors to direct the light beam may allow, for example, a laser beam to be used as the light directed at or near the second position. A laser beam is bright and non-divergent, for example as compared to light from a non-coherent source such as a bulb. Use of a laser beam may therefore allow for clearer feedback to be given in a precise way over a large range of distances from the light source.

Optionally, the method further comprises: obtaining data representing a command, by the user, associated with the first portion of the scene; and performing processing, based on the estimated first position, to enact the command.

This may allow for a command be enacted by the computer according to an estimate based on a user input and for which the user has been provided feedback via the control of the directing of light at or near the second position. Accordingly, the occurrence of a command being issued by the user, and hence the command being enacted by the computer, that is associated with an incorrect interpretation by the computer of the user input can be reduced. An efficient user-machine interface or interaction can be provided for.

Optionally, the method further comprises: obtaining data representing further user input relating to an adjustment of the identified first portion of the scene; estimating, based on the further user input and based on the first position, an adjusted first position within the model corresponding to the adjusted first portion of the scene; determining adjusted control information for controlling a light source to direct light at or near an adjusted second position in real space corresponding to the adjusted first position; and outputting the adjusted control information to control a light source.

Providing for an adjustment of the user input, and accordingly adjusting the control information, may allow for an ongoing cycle of user input and feedback, and hence may allow for a more accurate and/or precise estimation of the first position within the scene model that corresponds to the first portion identified by the user input. In some examples, the further user input may comprise an adjustment by the user of an outline of a region located at the second position, or may comprise an adjustment by the user of a specific one of a plurality of objects at or near the position at which light is controlled to be directed.

Optionally, the further user input identifies a direction relative to the first portion in real space and estimating the adjusted first position comprises: determining a direction within the model corresponding to the direction in real space; and estimating the adjusted first position based on the determined direction within the model.

The adjustment of the first position based on a direction relative to the first position may provide for a precise, efficient, and/or intuitive adjustment mechanism. Alternatively or additionally, this may allow for an element of relative adjustment to be provided to an absolute estimation of the first position and determination of the control instructions. This may allow for unambiguous feedback to be provided but nonetheless also for relative adjustments to be made if required. For example, a scene in real space may comprise two objects positioned side-by-side. The estimated first position within the model of the scene may correspond to the object on the left from the user's perspective whereas the intention of the user was to identify the object on the right. That the estimated first position within the scene model corresponds to the object on the left from the user's perspective is fed back to the user via the control of the light source. The further user input may comprise a direction relative to the object first portion, for example the user may make a nudging gesture to the right from the user's perspective and/or the user may make an utterance such as 'no, the object to the right'. From this the relative direction 'right' may be derived and the data representing the further user input data generated and obtained. Based on this data a direction within the model corresponding to the direction in real space may be determined and an adjusted first position is estimated based thereon. For example, the first position may be adjusted to correspond to that of the object on the right from the user's perspective. This adjustment may be fed back to the user via the appropriate adjustment of the control instructions.

According to a second aspect of the present invention, there is provided apparatus for providing feedback to a user input, the apparatus comprising: a processing unit configured to: obtain data representing a scene model derived from scene data representing a scene in real space; obtain data representing a user input identifying a first portion of the scene in real space; estimate, based on the user input data, a first position within the scene model corresponding to the first portion of the scene; determine control information for controlling a light source to direct light at or near a second position in real space corresponding to the first position within the scene model; and output the control information to control a light source, thereby to provide for feedback to the user input.

The apparatus may allow for an efficient and effective user-computer interface or interaction to be provided.

Optionally, the apparatus comprises the light source, the light source being configured to receive the output control information and direct light according to the control information.

This may provide that the feedback is provided by the apparatus itself.

Optionally, the apparatus comprises a sensor configured to capture the user input and provide the data representing the user input to the processing unit.

This may provide that the apparatus itself determines the user input to which the feedback is provided. The sensor may be comprise a camera, such as a depth camera, and/or a microphone.

Optionally, the apparatus comprises a sensor configured to capture the scene data. The sensor configured to capture the scene data may be, for example a depth camera. In some examples, the sensor configured to capture the user input is the sensor configured to capture the scene data.

Optionally, the apparatus is a robot.

A robot may be defined as a machine that carries out a task by physically moving. The apparatus being a robot may allow for the apparatus to carry out a task, based on the user input identifying a portion of the scene, by physically interacting with the scene in real space. This may provide utility.

Further features will become apparent from the following description, given by way of example only, which is made with reference to the accompanying drawings.

BRIEF DESCRIPTION OF THE DRAWINGS

FIGS. 8A to 8C are schematic diagrams illustrating an implementation of the method according to a fifth example;

DETAILED DESCRIPTION

Details of apparatuses and methods according to examples will become apparent from the following description, with reference to the Figures. In this description, for the purpose of explanation, numerous specific details of certain examples are set forth.

Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples.

Figure 1:
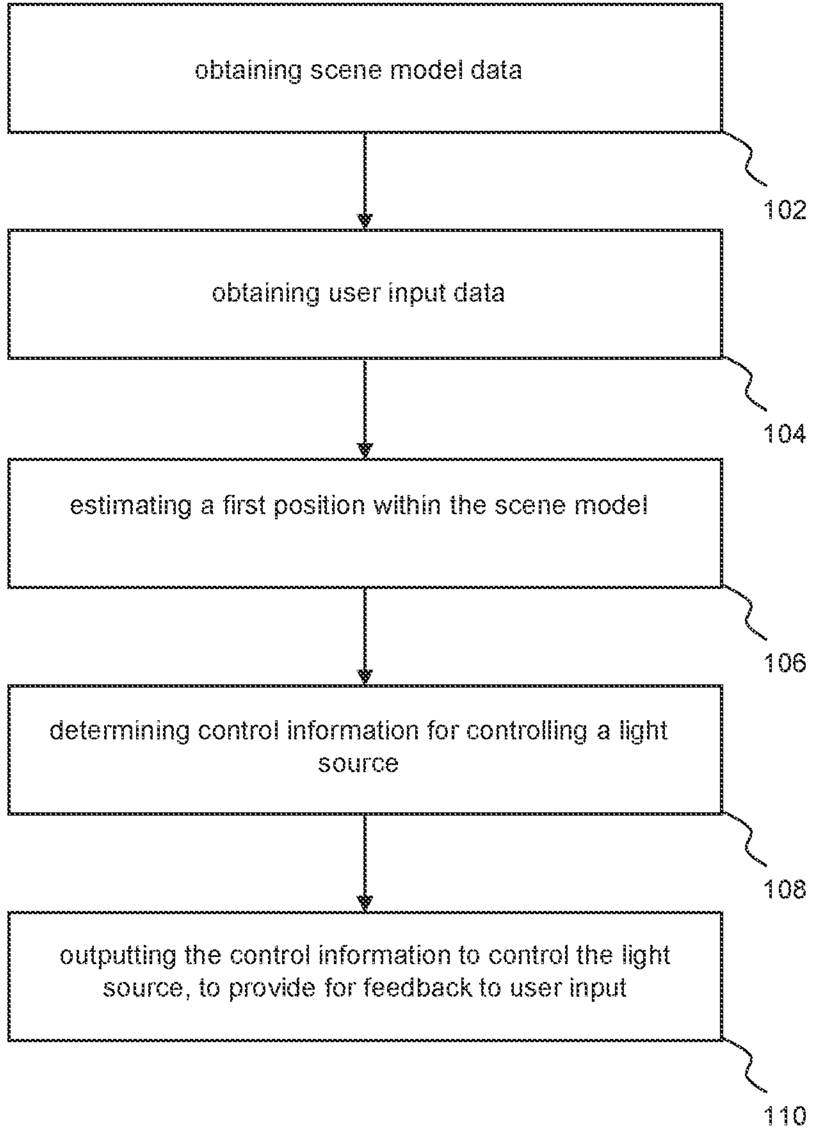
FIG. 1 is a flow diagram that illustrates schematically a method according to an example.

FIG. 1 is a flow diagram that illustrates a computer implemented method for providing feedback to a user input.

Figures 2A, 2B, 2C:
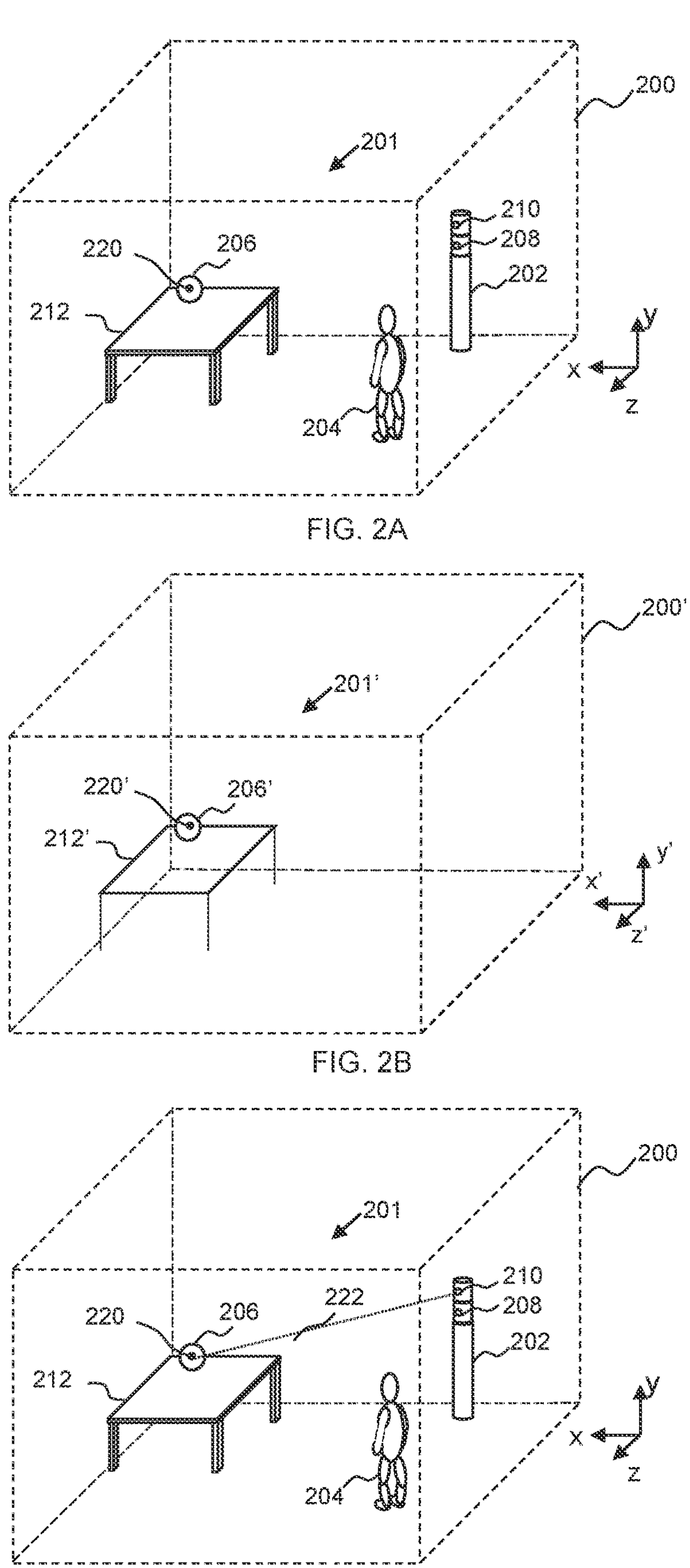
FIGS. 2A to 2C are schematic diagrams illustrating an implementation of the method according to a first example.

Reference is briefly made to FIGS. 2A and 2B by way of introduction to an example context in which the method of FIG. 1 may be implemented.

Referring to FIG. 2A, there is illustrated a scene 201 in real space 200. The scene 201 has various portions 206, 212, in this example a ball 206 and a table 212. The real space 200 also includes a user 204 and an apparatus 202.

Referring to FIG. 2B, there is illustrated a scene model 201' in virtual space 200'. The scene model 201' is a computer model of the scene 201 in real space 200. The virtual space 200' is virtual in that it is a computer construct within which the scene model 201' may be defined. In this example, the scene model 201' comprises portions 206', 212' corresponding to portions 206, 212 of the scene 201.

The scene model 201' is derived from scene data representing the scene 201 in real space 200. For example, the scene data may comprise one or more depth images of the scene 201 captured by a depth camera 208 of the apparatus 202, and the scene model 201' may be derived based on the information contained in the one or more depth images.

The scene model 201' may represent a computer's understanding of the scene 201. For example, the scene model 201' may represent the apparatus' 202 understanding of the scene 201. The user 204 may wish to provide an input to the computer, for example a computer of the apparatus 202, with reference to the scene 201, for example a portion 206 of the scene 201. This may be so as to identify a portion of the scene 201 to which some function or action is to be applied by or via the computer.

Referring again to FIG. 1, a computer implemented method for providing feedback to a user input is illustrated.

The method comprises, in step 102, obtaining data representing a scene model derived from scene data representing a scene in real space. For example, the data obtained may be data representing the scene model 201' of FIG. 2B derived from scene data representing the scene 201 in real space 200 of FIG. 2A.

The method comprises, in step 104, obtaining data representing a user input identifying a first portion of the scene in real space. For example, the user input data obtained may be data representing a user input by the user 204, identifying a first portion 206 of the scene 201 in real space 200 of FIG. 2A. In some examples, the user input may comprise a physical gesture of the user 204, for example the user 204 may point to the first portion 206 of the scene 200 to identify it. In some examples, the user input may comprise a utterance of the user 204, for example the user may utter or vocalise an identifier associated with the first portion 206 of the scene 200, for example uttering the word 'ball', in order to identify it.

The method comprises, in step 106, estimating, based on the user input data, a first position within the scene model corresponding to the identified first portion of the scene. For example, a position 220' within the scene model 201' of FIG. 2B that is estimated to correspond to the first portion 206 of the scene 201 of FIG. 2A identified by the user input may be taken as the first position 220'.

The method comprises, in step 108, determining control information for controlling a light source to direct light at or near a second position in real space corresponding to the first position within the scene model. For example, referring to FIG. 2C, control information may be determined for controlling a light source 210 of the apparatus 202 to direct light 222, such as a laser beam 222, at or near a position 220 in real space 200 that corresponds to the first position 220' within the scene model 201.

The method comprises, in step 110, outputting the control information to control a light source, thereby to provide for feedback to the user input. For example, the control information may be output to control the light source 210, to provide for feedback to the user input of the user 204, for example as illustrated in FIG. 2C.

Outputting the control information to control the light source 210 allows for the light source 210 to direct light to the second position 220, and thereby allows for feedback to be provided to the user input. By this feedback, the user 204 is informed of the computer's interpretation or understanding of the user input. Specifically, the user 204 is informed of the computer's estimate of the first position 220' within the scene model 201' that corresponds to the first portion 206 of the scene 201 in real space 200 identified by the user input. The user 204 is therefore able to readily assess the computer's interpretation of the user input and, for example, whether this corresponds to the interpretation intended by the user 204. The occurrence of an action being taken by the computer based on an incorrect interpretation of the user's input can be therefore be reduced. An efficient user-machine interface or interaction can therefore be provided for. Moreover, outputting the control information to control a light source 210 to direct light at or near the second position 220 in real space 200 allows for the feedback to be provided in a clear and direct manner in the scene 201 in real space 200. Effective feedback may therefore be provided for. Moreover, the feedback can be provided for a user input that refers to a portion 206 of a scene 201 in real space 200, rather than being limited to, for example, user input that refers to a portion of a display screen. Flexible feedback may therefore be provided for. In combination, efficient and effective user-computer interface or interaction may be provided for by the method.

As mentioned, in step 102, the method comprises obtaining data representing a scene model 201' derived from scene data representing a scene 201 in real space 200.

In some examples, obtaining the data representing the scene model 201' may comprise deriving the scene model 201' from scene data representing the scene 201 in real space 200.

In some examples, obtaining the data representing the scene model 201' may comprise capturing the scene data representing the scene 201, and deriving the scene model 201' from scene data representing the scene 201.

For example, the scene data may be captured using a sensor, such as a camera or depth camera. For example, the scene data may be captured using the sensor 208 of the apparatus 202. The scene data may comprise 3-Dimensional data. For example, the scene data may comprise a depth image of the scene 201, for example as captured by a depth or 'RGBD' camera 208. Deriving the scene model 201' from the scene data may comprise transforming the scene data from a sensor coordinate system a coordinate system x', y', z' of the scene model 201'. Deriving the scene model 201' from the scene data may comprise segmenting the scene data into portions and/or performing object recognition on the scene data. The scene model 201' may comprise 3-Dimensional positions and dimensions of one or more segmented or recognised portions of the scene data in the coordinate system x', y', z' of the virtual space 200'. The data representing the scene model 201' may comprise positions and dimensions, within the coordinate system x', y', z' of the virtual space 200', of representations of portions 106', 212' of the scene model 201'.

In some examples, obtaining the data representing the scene model 201' comprises receiving the data representing the scene model 201'.

For example, the data representing the scene model 201' may be received from a module that derives the scene model 201' or from a storage device in which the scene model 201' is stored.

As mentioned, in step 104, the method comprises obtaining data representing a user input identifying a first portion 206, 226 of the scene 201 in real space 200.

In some examples, the user input data comprises data representing a physical gesture of the user 204. The input data comprising data representing a physical gesture of the user 204 may provide for accurate and/or reliable identification of the first portion 206 of the scene 201.

In some examples, the physical gesture of the user 204 may be a pointing gesture by the user's arm or finger. For example, the user 204 may point at portion 206 of the scene 201 to identify it. As another example, the physical gesture may be a rotation or other movement of an arm of the user 204. For example, the user 204 may rotate or sweep their arm at or towards a portion 206 in order to identify it.

In some examples, the user input data may comprise a vector or a sequence of vectors derived from a model of the user.

Figure 3A:
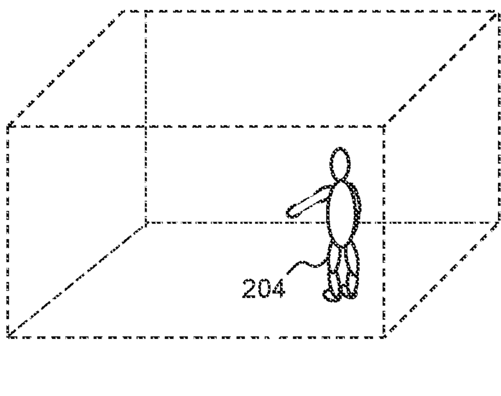
FIGS. 3A and 3B are schematic diagrams illustrating a user model according to an example.
Figure 3B:
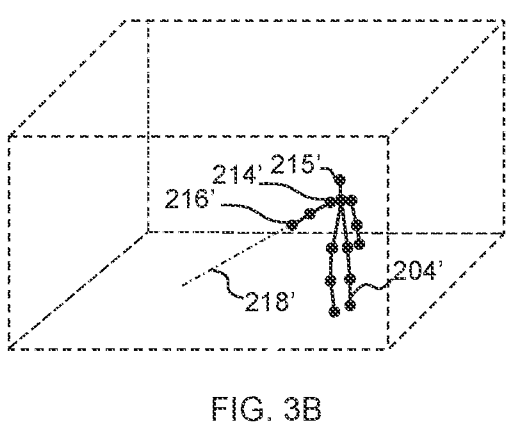

As an example, FIG. 3A illustrates a user 204 in real space 200 performing a pointing gesture. FIG. 3B illustrates a model 204' of the user 204 of FIG. 3A. The user model 204' is in virtual space 200". A vector 218' is derived from the model 204'. Specifically, in this example, a shoulder-to-wrist vector 218', i.e. a vector from a shoulder portion 214' of the user model 204' to a wrist portion 216' of the user model 204' is derived.

Figure 4A:
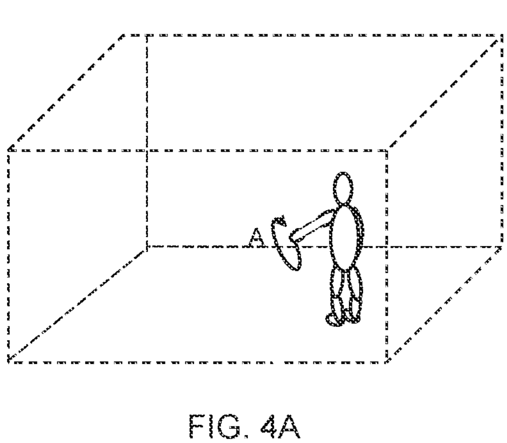
FIGS. 4A and 4B are schematic diagrams illustrating a user model according to an example.
Figure 4B:
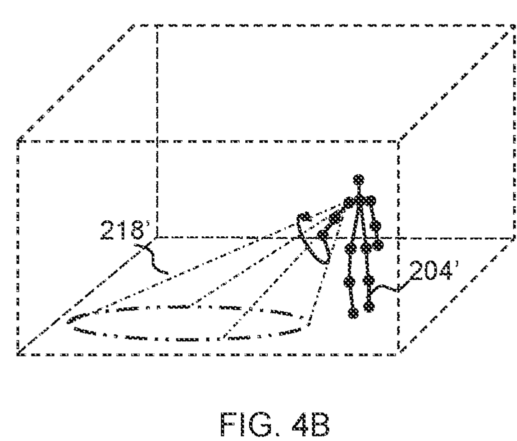

As another example, FIG. 4A illustrates a user 204 in real space performing a movement of their arm, specifically a rotation A of an outstretched arm. FIG. 4B illustrates a model 204' in virtual space 200" of the user 204 of FIG. 4A. A sequence of vectors 218' may be derived from the model 204' of the user. Specifically, in this example, the shoulder-to-wrist vectors 218' defined at successive points in time during the rotating movement of the user's arm may define the sequence of vectors 218'.

The virtual space 200" in which the user model 204' is constructed and/or within which the vector or vectors 218' are defined may be the same or different to the virtual space 200' in which the scene model 201' is constructed. If the virtual spaces are different then a calibration and/or coordinate transformation may be applied to align the coordinate systems of the virtual spaces. This may allow for an accurate estimation of the first position 220' based on the vector or vectors 218' of the user input data.

In some examples, obtaining the user input data may comprise deriving the vector or sequence of vectors 218' from the model 204' of the user 204. For example, deriving the vector 218' from the user model 204' of FIG. 3B may comprise determining a vector from the shoulder portion 214' of the model 204' to the wrist portion 216' of the model 204'.

In some examples, obtaining the user input data may comprise deriving the model 204' of the user from data representing the user 204 in real space 200. For example, the data representing the user 204 in real space may comprise one or more images such as depth images of the user 204, for example captured by a camera such as a depth camera. The information contained in the one or more depth images may be used to construct the model 204' of the user 204. For example, as shown in FIGS. 3B and 4B, the user model 204' may be a skeleton model 204' in which the user 204 is represented by points 214', 216' located in the virtual space 200" modelled as corresponding to the locations of major parts and joints of the user 204.

In some examples, obtaining the user input data may comprise capturing the data representing the user 204 in real space 200 and deriving the model 204' of the user 204 from this data. For example, the data may be captured by a sensor, such as a camera, such as a depth camera.

As mentioned, in some examples, the or each vector 218' may be a shoulder-to-wrist vector 218'.

The or each vector 218' being a shoulder-to-wrist vector derived from the model 204' of the user 204 may allow for the consistent reproduction of the intention of a pointing gesture of the user 204, or of a sweeping or 'lasso' gesture of the user 204'. For example, the shoulder-to-wrist vector 218' is resilient to the extent to which a user's elbow may be bent, which may vary from user to user or from time to time for a given user 204.

In some examples, the or each vector may be a head-to-wrist vector (not shown) derived from the model 204' of the user 204. For example, the head-to-wrist vector may be a vector from a head portion 215' of the user model 204' to the wrist portion 216' of the user model 215'. The vector being a head-to-wrist vector derived from the model 204' of the user may allow for reasonably accurate reproduction of the intention of a pointing or 'lasso' gesture of the user, for example in cases where the shoulder-to-wrist vector 218' is not determinable or is ambiguous.

The user input data comprising a vector 218' or sequence of vectors 218' derived from a model 204' of the user 204 may allow for an accurate and/or reliable estimation of the first position 220' within the scene model 201. The vector 218' or vectors 218' being derived from a model 204' of the user 204 may allow for the accurate and/or reliable estimation without necessarily encumbering the user with an input device or sensor attached to the user. An improved user-computer interface or interaction may therefore be provided. The user input data comprising a sequence of vectors 218' derived from a model 204' of the user 204 may allow for improved flexibility in the identification of the first portion 206 of the scene and hence estimation of the first position 220' within the scene model 201. For example, using the sequence of vectors 218' may allow for the user input to correspond to a 'lassoing' type gesture and hence for identification of one or a plurality of objects or regions of the scene and/or to define an extent of, as well as identify, a first portion such as a region of the scene in real space 200.

As mentioned, in step 106, the method comprises estimating, based on the user input data, a first position 220' within the scene model 201' corresponding to the identified first portion 206 of the scene 201.

In some examples, estimating the first position 220' may comprise: determining an object 206' or region of the scene model 201' intersected by the vector 218' or encompassed by the sequence of vectors 218'; and determining the first position 220' based on a position 220' of the object 206' or region.

Figure 5A:
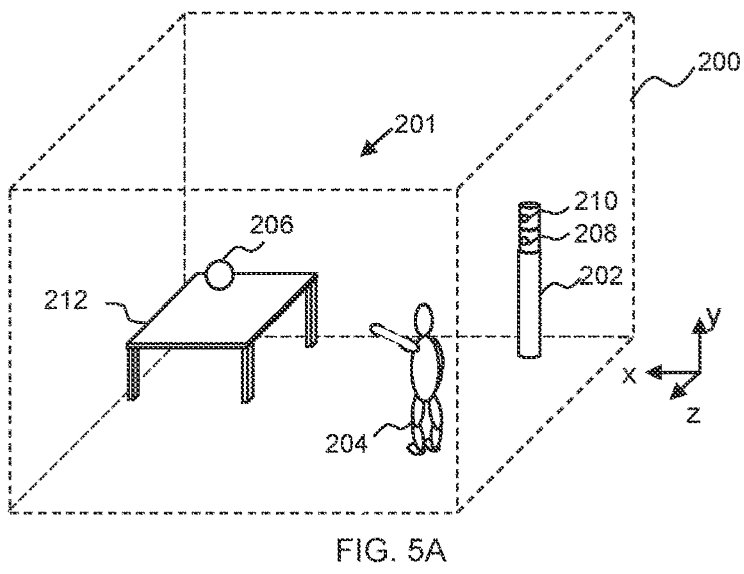
FIGS. 5A to 5C are schematic diagrams illustrating an implementation of the method according to a second example.
Figure 5B:
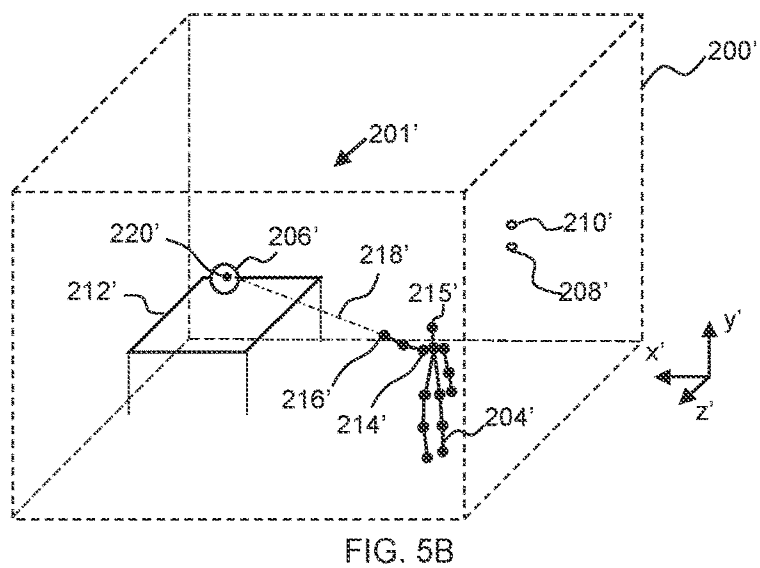
Figure 5C:
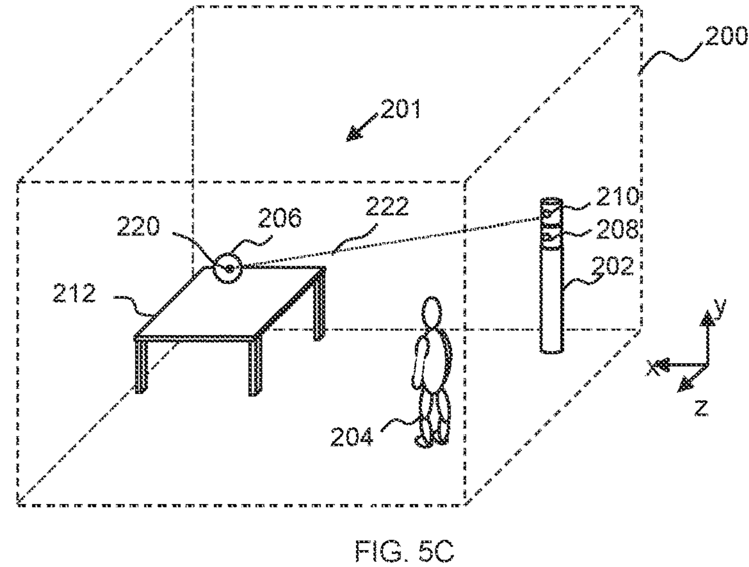

For example, FIGS. 5A and 5B illustrate an example in which estimating the first position 220' comprises determining an object 206' of the scene model 201' intersected by the vector 218' and determining the first position 220' based on a position 220' of the object 206'. In FIG. 5A, the user 204 points to an object 206 of the scene 201 in real space 200 to identify it. In FIG. 5B, a vector 218' is derived from a model 204' of the user 204. In this example, the vector 218' is a shoulder-to-wrist vector 218 of a skeleton model 204' of the user 204. In this example, the user model 204' is constructed in the same virtual space 200' as is the scene model 201'. In this example, the vector 218' intersects a first object 206', in this example a ball 206', of the scene model 201'. In this example, the first position 220' within the scene model 201' corresponding to the identified first portion 206 of the scene 201 is estimated based on the position 220' of the first object 206' of the scene model 201' that the vector 218' intersects. Specifically, in this example, the first position 220' is taken as the position 220' of the first object 206' within the scene model 201'. As illustrated in FIG. 5C, control information is determined for controlling the light source 210 to direct light 222 at or near a position 220 in real space 200 that corresponds to the first position 220' within the scene model 201. Specifically, in this example, the control information controls the light source 210 to direct light 222 at the second position 220, that corresponds to the position of the of the first object 206' in the scene model 201'. As a result, the light 222, such as a laser beam, is directed at the object 206 in real space 200. The user 204 can see the light 222 striking the object 206, and feedback to the user input is thereby provided.

Figure 6A:
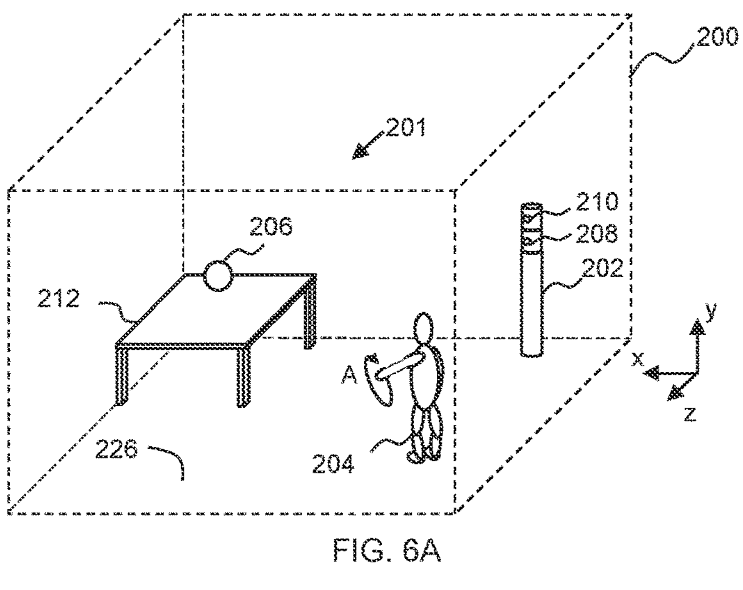
FIGS. 6A to 6C are schematic diagrams illustrating an implementation of the method according to a third example.
Figure 6B:
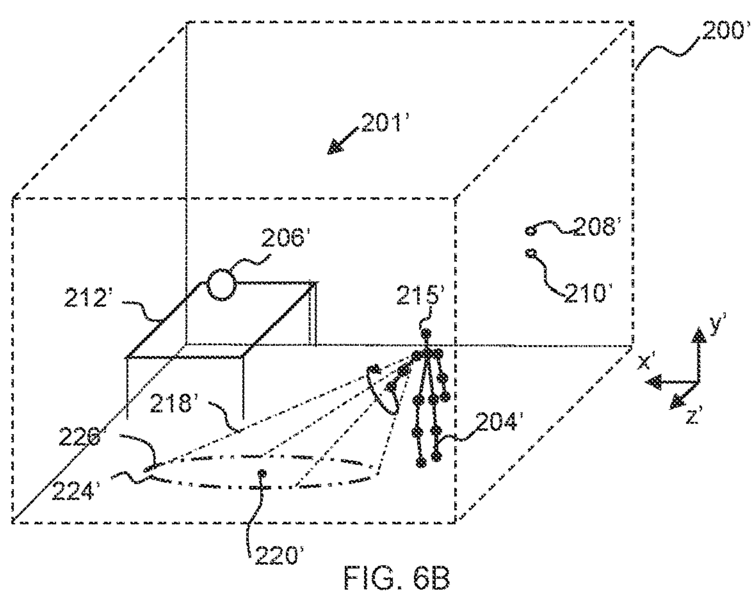
Figure 6C:
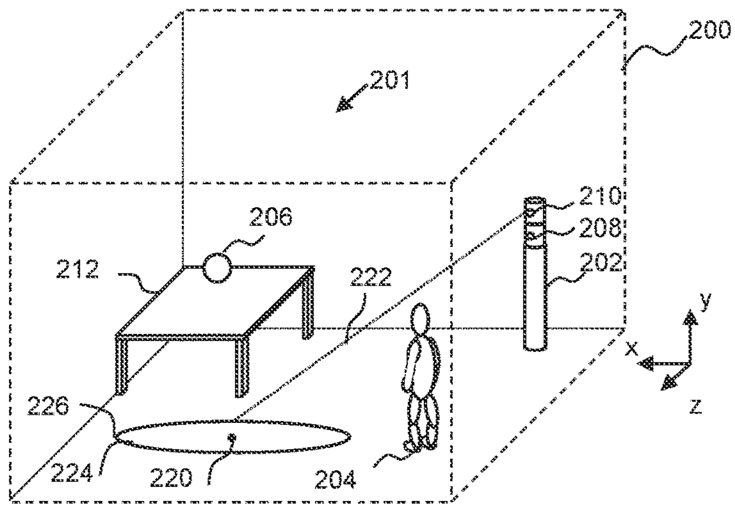

As another example, FIGS. 6A and 6B illustrate an example in which estimating the first position 220' comprises determining a region 216' encompassed by the sequence of vectors and determining the first position 220' based on a position 220' of the region 226'. In FIG. 6A, the user 204 rotates A their outstretched arm towards a region 226 of the scene 201 in real space 200 to identify it. In FIG. 6B, a sequence of vector 218' is derived from a model 204' of the user 204. In this example, the vectors 218' are shoulder-to-wrist vectors 218' of a skeleton model 204' of the user 204. In this example, the user model 204' is constructed in the same virtual space 200' as is the scene model 201'. In this example, the sequence of vectors 218' encompass a first region 226' of the scene model 201'. In this example, the first position 220' within the scene model 201' corresponding to the identified first portion 226 of the scene 201 is estimated based on the position 220' of the first region 226' of the scene model 201' encompassed by the sequence of vectors 218'. Specifically, in this example, the first position 220' is taken as the position 220' of the first region 226' within the scene model 201'. As illustrated in FIG. 6C, control information is determined for controlling the light source 210 to direct light 222 at or near a position 220 in real space 200 that corresponds to the first position 220' within the scene model 201. Specifically, in this example, the control information controls the light source 210 to direct light 222 near the second position 220 that corresponds to the position of the of the first region 226' in the scene model 201'. Specifically, the control information controls the light source 210 to direct light 222 to outline a region 226 that corresponds to the first region 226' in the scene model 201'. As a result, the light 222, such as a laser beam, is directed to outline the region 226 in real space 200. The user 204 can see the light 222 striking a surface of the region 206, and feedback to the user input is thereby provided.

Determining an object 206' or region 226' of the scene model 201' intersected by the vector 218' or encompassed by the sequence of vectors 218', and then determining the first position 220' based on the position 220' of that object 206' or region 226' within the scene model 201', may allow for an absolute and/or unambiguous feedback to be provided. For example, this may allow for light 222 to be controlled to be directed at or near a second position 220 that corresponds to an object 206' or region 226' in the scene model estimated 201' as corresponding to the object 206 of region 226 of the scene 201 identified by a user input. The feedback may therefore be provided in a precise, unambiguous and absolute way with respect to objects 206 or regions 226 of the scene 201, for example as compared to if the second position was based only and/or directly on the vector 218.

In some examples, determining the first position 220', and determining the control instructions, are responsive to a determination that an object 206' or region 226' of the scene model 201' is intersected by the vector 218' or encompassed by the sequence of vectors 218'. For example, if there is no object 206' or region 226', for example no particular object 206' or region 226', of the scene model 201' determined as intersected or encompassed by the vector 218' or sequence of vectors 218', then no first position 220' may be determined and no control instructions or updated control instructions may be determined. Accordingly, the light source 210 may not be controlled to direct light at the scene 201 or may not be controlled to change a position at or near which light is being directed. On the other hand, if there is an no object 206' or region 226' of the scene model 201' determined as intersected or encompassed by the vector 218' or sequence of vectors 218', then the first position 220' may be determined as above and control instructions or updated control instructions may be determined as above. The light source 210 may therefore be controlled to direct light 222 at or near the second position 220 corresponding to the first position 220'. This may allow for a 'snapping' type feedback on the user identification of objects 206 or regions 226 of the scene 201, for example where the feedback to the user input is not provided unless and until it is determined that that user input corresponds to an object or region of the scene. This may provide for a clearer, less ambiguous, and more intuitive feedback to be provided.

As mentioned, in step 104, the method comprises obtaining data representing a user input identifying a first portion 206, 226 of the scene 201 in real space 200.

In some examples, the user input data may comprise data representing an utterance of the user. For example, the user input data may comprise an identifier of an object 206 or region 226 derived from sound data representing the utterance of the user. In some examples, obtaining the user input data may comprise deriving the identifier of the object 206 or region 226 from the sound data. For example, speech recognition and/or natural language processing may be applied to the sound data to determine an identifier, such as a name, of an object 206 or region 226 of the scene 201. In some examples, obtaining the user input data may comprise capturing the utterance of the user 204 to produce the sound data and deriving the identifier of the object 206 or region 226 from the sound data. For example, the utterance of the user 204 may be captured by a microphone (not shown) or the other sensor capable of capturing sound.

The user input data comprising data representing an utterance of the user 204 may allow for efficient processing of the user input and hence estimation of the first position 220'. For example, this may be as compared to user skeleton modelling which can be resource intensive. In some examples, the data representing an utterance of the user may be used in combination with the other user input data, such as data representing a physical gesture of the user 204. The combination of the utterance data with other user data such as the gesture data may allow for improved accuracy, disambiguation, and/or for failsafe in the estimation of the first position 220' within the scene model 201'.

The user input data comprising an identifier of an object or region derived from sound data representing the utterance of the user may allow for the first position to be determined based on an object 206' or region 226' of the scene model 201, which may in turn may provide for precise, unambiguous and/or absolute feedback to be provided.

In some examples, estimating the first position 220', as in step 106 of the method, may comprise: mapping the identifier onto an object 206' or region 226' of the scene model 201'; and determining a position of the object 206' or region 226' onto which the identifier is mapped as the first position 220'.

Figure 7A:
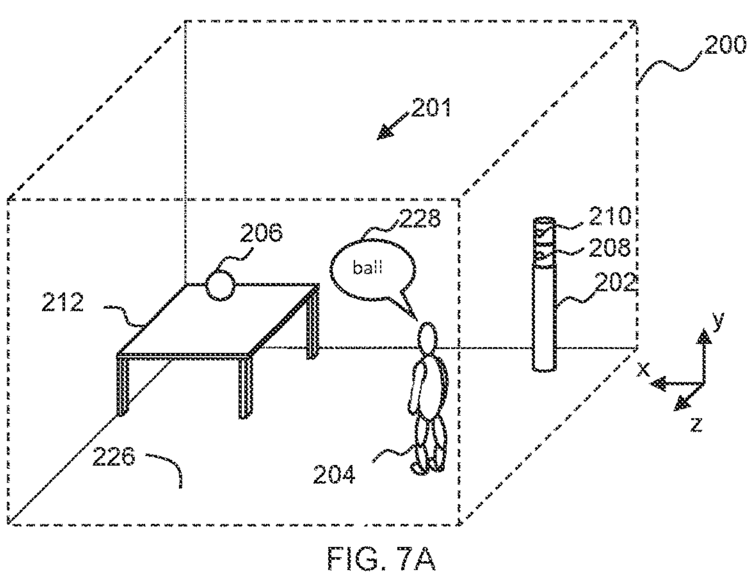
FIGS. 7A to 7C are schematic diagrams illustrating an implementation of the method according to a fourth example.
Figure 7B:
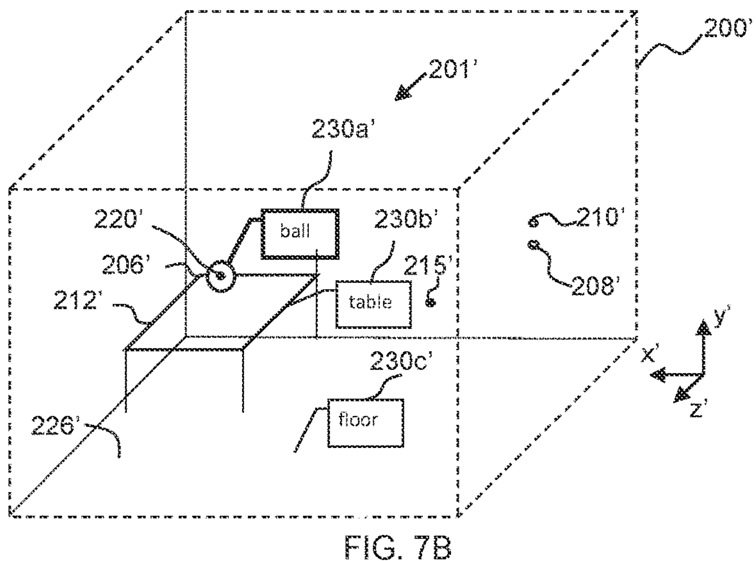
Figure 7C:
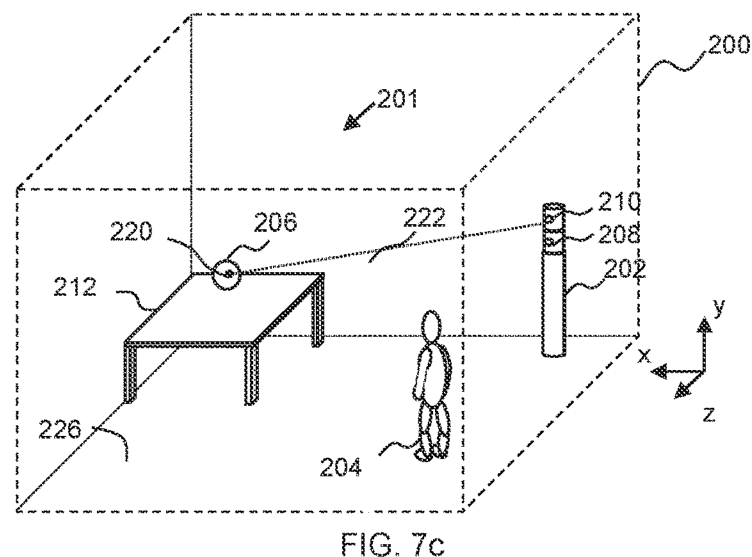

For example, FIGS. 7A and 7B illustrate an example in which estimating the first position 220' comprises mapping an identifier derived from an utterance 228 of the user 204 onto an object 206' or region 226' of the scene model 201'. In FIG. 7A, a user 204 interacting with the scene 201 in real space 200 utters 228 the word 'ball', so as to identify the first object 206 which is a ball. The utterance 228 may be captured by a microphone (not shown) of the apparatus 202 and the sound data resulting therefrom may be analysed to determine that the utterance 228 contains the identifier 'ball'. In FIG. 7B, a scene model of 201' of the scene 201 of FIG. 7A is constructed in virtual space 200'. The scene model 201' comprises objects 206', 212' and regions 226' corresponding to the objects 206, 212, and regions 226 of the scene 201 in real space 200. Object recognition has been applied to the objects 206', 212' and regions 226' of the scene model 221, and the objects 206', 212' and regions 226' have been assigned labels according to the object recognition. Specifically, the first object 206' corresponding to the ball 206 is assigned the label 'ball' 230*a'*, the second object 212' corresponding to the table 212 is assigned the label 'table' 230*b'*, and the first region 226' corresponding to a floor region 226 is assigned the label 'floor' 230*c'*. The identifier 'ball' derived from the utterance 228 of the user 204 is compared to each of the labels 230*a'*-230*c'* and it is determined to correspond to the label 'ball' 230*a*. Accordingly, the identifier is mapped onto the first object 206' of the scene model 201' associated with the label 230*a'*. The first position 220' within the scene model 201' corresponding to the identified first portion 206 of the scene 201 is estimated based on the position 220' of the first object 206' of the scene model 201' onto which the identifier is mapped. Specifically, in this example, the first position 220' is taken as the position 220' of the first object 206' within the scene model 201'. As illustrated in FIG. 7C, control information is determined for controlling the light source 210 to direct light 222 at or near a position 220 in real space 200 that corresponds to the first position 220' within the scene model 201. Specifically, in this example, the control information controls the light source 210 to direct light 222 at the second position 220, that corresponds to the position of the of the first object 206' in the scene model 201'. As a result, the light 222, such as a laser beam, is directed at the object 206, i.e. the ball 206, in real space 200. The user 204 can see the light 222 striking the object 206, i.e. ball 206, and feedback to the user input is thereby provided.

Determining a position of the object 206' or region 226' onto which the identifier derived from the user utterance 228 is mapped as the first position 220' may allow for precise, unambiguous and/or absolute feedback to be provided. For example, this may allow for light 222 to be directed at or near a second position 220 that corresponds to an object 206' or region 226' in the model 201' mapped onto the identifier in the user input. The feedback may therefore be provided in a precise, unambiguous and absolute way with respect to objects 206, 212 or regions 226 of the scene 201, for example as compared to if the second position 220 was determined based on a user input defining a position relative to some fixed origin.

In some examples, determining the first position 220' and determining the control instructions, may be responsive to a determination that the identifier maps onto an object 206', 212' or region 226' of the scene model 221. This may allow for a 'snapping' type feedback discussed above, for example where the feedback to the user input is not provided unless and until it is determined that there is an user utterance that contains an identifier that maps onto an object 206', 212' or region 226' of the scene model 201'. This may provide for a clearer, less ambiguous, and more intuitive feedback to be provided.

As mentioned, in step 108, the method comprises determining control information for controlling a light source 210 to direct light 22 at or near a second position 220 in real space corresponding to the first position 220' within the scene model 201'.

A position 210' within the model 210 corresponding to the position of the light source 210 in real space 200 is known. For example, in the case where the scene model 201' is derived from data from a sensor 208 such as a depth camera 208 of the apparatus 202, the position 208' within the model 201' corresponding to the position of the sensor 208 in real space 200 is known. For example, it may define an origin position of the coordinate system of the model 201'. Where the light source 210 is also part of the apparatus 202, then the position of the light source 210 relative to the sensor 208 may be known and/or fixed, and hence the position within the model 201' corresponding to the position of the light source 210 in real space 200 may be known and/or derived.

For example, the control information may comprise a vector, or a representation thereof such as a combination of angles, according to which the light source 210 is to direct light such that the light 222 from the light source 210 falls at a position at or near the second position 220. For example, a directing vector from the position 210' in the model 201' corresponding to the position of the light source 210, to the first position 220' within the model 201' may be determined. If the coordinate system of the model 201 is aligned with the coordinate system of the light source 210, then the control information may be determined to include the directing vector, which the light source 210 may then use to direct the light 222 to the second position 220. If the coordinate systems are not aligned, then an appropriate coordinate transformation may be applied to the vector.

In some examples, the determined control information may be for controlling the light source 210 to direct light 222 at a fourth position 221 in real space 200, at or near the second position 220, corresponding to a fifth position 221' within the model 201', at or near the first position 220'. For example, a directing vector from the position 210' in the model 201' corresponding to the position of the light source 210, to the fifth position 220' within the model 201' may be determined. The control instructions may comprise this directing vector, or a transformation or representation thereof, so as to control the light source 210 to direct light at the fourth position 221. In such a way, the control instructions need not necessarily control the light source 210 to direct light at the second position 220, but may control the light source 210 to direct light near the second position 220 in a controlled and precise manner. This may provide for flexibility in the way in which the feedback is provided for.

In some examples, the control information may be determined based on data representing a third position 215' within the scene model 201 corresponding to a position of the user 204 in real space 200. For example, the third position 215' may correspond to a position of the head or the eyes or an eye of the user 204. The third position 215' may be determined based on a model 204' of the user 204, for example as illustrated in FIGS. 5B and 6B. For example, the position of the head portion 215' of the model 204' of the user 204 as represented in the virtual space 200' containing the scene model 201, may be taken as the third position 215'. If the user model 204' and the scene model 201 are constructed in different virtual spaces 200', then the position of the head portion 215' of the user model 204' within the scene model 201 may be determined by appropriate coordinate transformation. In some examples, the third position 215' may be determined by a sensor configured to monitor the position of the user 204, for example the head or eye position of the user 204. In some examples, the third position 215' within the scene model 201' may be determined from the position of the user 204 in real space 200 as determined by the sensor by appropriate coordinate transformation.

Basing the determination of the control information additionally on a position 215' within the scene model 201' corresponding to a position of the user 204 in real space 200 may allow for the control information to be determined so as to control a light source 210 to direct light 222 in such a way that when the light 222 falls at or near the second position 220, the light 222 can be clearly viewed by the user 204. This may in turn provide for feedback to be more reliably and consistently delivered to the user. Alternatively, or additionally, this may in turn provide for improved flexibility in the possible relative orientations of the portion 206, user 204, and light source 210 for which feedback can be given.

Referring to FIGS. 8A to 8C, in some examples, the control information may be determined based on an intersect position 223', the intersect position 223' being a position at which a vector 225' from the light source position 210' to the first position 220' intersects a surface of an object 206' of the scene model 201'. The intersect position 223' may correspond to a position on the surface of the object 206 at which light 222 from the light source 210 strikes.

Basing the determination of the control information additionally the intersect position 223' may allow for the control information to be determined so as to control a light source 210 to direct light 222 in such a way that when the light 222 falls at or near the second position 220, the light 222 can be clearly viewed by the user 204.

For example, the control information may be determined based on a determination of whether or not there is a clear line-of-sight within the scene model 201' between the third position 215' and the intersect position 223'. In this context, a clear line-of-sight may be taken to mean that there is no object or other obstruction in the model 201' between the intersect position 223' and the third position 215'. For example, if there is a clear line of sight between the third position 215' and the intersect position 223', then it may be inferred that controlling the light source 210 to direct light at the second position 220 corresponding to the first portion 220' would result in the light striking an object 206 being visible to the user. However, if there is not a clear line of sight between the third position 215' and the intersect position 223', then it may be inferred that controlling the light source 210 to direct light at the second position 220 corresponding to the first portion 220' would result in the light 222 striking the object 206 not being visible to the user.

In some examples, the determined control information is for controlling the light source 210 to direct light 222 at a fourth position 221 in real space 200, at or near the second position 220, corresponding to a fifth position 221' within the model 201', at or near the first position 220', and between which fifth position 221' and the third position 215' there is a clear line-of-sight.

This may help ensure that the user 204 is able to see the feedback, that is the light 222 falling at the fourth position 221 in real space, regardless of the relative orientation of the object 206, user 204 and light source 210, and/or taking into account any obstacles that might be between the object 206 and the user 204. For example, as is the case in FIGS. 8A to 8C, if the light source 210 for which the control instructions are determined is on the opposite side an object 206 identified by the user input to the user 204, then the control instructions may be determined to control the light source 210 to direct light 22 at a fourth position 221 near to the object 206 but displaced at right angles to a user-object-light source plane, such that the user 204 is able to see the light (or more specifically the reflection of the light) falling at the fourth position 211 and hence receive the feedback. Accordingly, the feedback may be more reliably delivered.

In some examples, determining the control information comprises: when it is determined that there is a clear line-of-sight between the third position 215' and the intersect position 223' position, determining control information for controlling the light source 210 to direct light 22 at the second position 220; and when it is determined that there is not a clear line-of-of sight between the third position 215' and the intersect position 223', determining control information for controlling the light source 210 to direct light 222 at the fourth position 221.

Directing light 222 at the second position 220 in real space 200 corresponding to the first position 220' within the scene model 201' may allow for light 222 to be shone directly at the first portion 206 identified by the user input, which may help provide for clear and unambiguous feedback. However, when it is determined that to do so would or might result in the user not being able to see that light (specifically the reflection thereof), for example by reference to the intersect position 223' as mentioned above, then the light 222 may be directed instead at the fourth position 221 i.e. near the second position 220 but for which it is determined that the user would be able to see the light 222 (specifically the reflection thereof). Hence feedback may be nonetheless reliably delivered. This may help provide that the clearest and most unambiguous form of feedback, given the specific relative orientations of the user 204, light source 210, and object 206 at that time, is provided.

For example, in FIG. 8A, a scene 201 comprises objects 206, 212. The user 204 is located on an opposite side of the objects 206, 212 to the light source 210. The user 204 points at the object 206 to identify it. In FIG. 8B, a scene model 201' is constructed in virtual space 200'. Also, within the virtual space 200' is the user model 204', in this example, a skeleton model 204'. A shoulder-to-wrist vector 218' is derived from the user model 204'. The vector 218' is determined to intersect the first object 206' within the scene model 201'. The position 220' of the first object 206' within the model 201' is estimated as the first position 220' corresponding to the user identified first portion 206 of the scene 201. However, in this example, there is not a clear line-of-sight between the third position 215, corresponding to the position of the head of the user 204, and the intersect position 223'. That is, the first object 206' obstructs the line-of-sight between the third position 215' and the intersect position 223'. Accordingly, there is determined a fifth position 221', near the first position 220' and between which fifth position 221' and the third position 215' there is a clear line-of-sight. As depicted in FIG. 8C, control instructions are generated to control the light source 210 to direct light 22 near the second position 220 corresponding to the first position 221. Specifically, control instructions are generated to control the light source 210 to direct light 22 at the fourth position 221, corresponding to the fifth position 221'. Accordingly, the user 204 is able to see the feedback.

In some examples, the control information is for controlling the light source 210 to project a symbol 234 onto a first surface 232 at or near the second position 220. For example, the control information may comprise data representing the symbol to be projected. A symbol may be defined as something used for or regarded as representing something else. The symbol may be an image, text, indicator, and/or marker. For example, as depicted in FIG. 8C, the control information controls the light source 210 to project a symbol 234, in this case an arrow 234, at the fourth position 221, in this case onto the surface 232 at the fourth position 221.

The control information being for controlling the light source 210 to project a symbol 234 onto a first surface 232 at or near the second position 220 may allow for further information to be provided in the feedback, for example as compared to a laser point alone.

In some examples, the symbol 234 may be an animated symbol 234. For example, the symbol 234 may be a dynamic or moving symbol 234, such as an animated or dynamic or moving image, text, indicator and/or marker.

The symbol being an animated symbol may provide for improved visibility of the symbol 234, for example as compared to a static symbol projected onto the first surface 232. This may provide for clearer feedback to be provided to the user 204.

In some examples, determining the control information comprises: determining an affine transformation to correct for an angle of incidence of a vector 227' from a sixth position 210' within the scene model 201 to a second surface 232' within the scene model 201, the sixth position 210' corresponding to a position of the light source 210 in real space 200, the second surface 232' corresponding to the first surface 232 in real space 200; and applying the affine transformation to the symbol 234 to be projected onto the first surface 232. For example, the surface located at the fifth position 221' may be determined as the second surface 232', and the angle of incidence of the vector 227' to the second surface 232' may be calculated. This angle may be used to apply an affine transformation to the symbol 234 to be projected onto the first surface 232.

The affine transformation may allow for the symbol 234, such as an image or text, to maintain a correct aspect ratio when projected onto the first surface 232, regardless of the relative positions of the light source 210 and the first surface 232. This may provide for clear feedback to be provided reliably to the user.

In some examples, such as that illustrated in FIG. 8C, the symbol 234 may comprise an arrow 234, and determining the control information may comprise: determining a rotational transformation to orientate a point 236 of the arrow towards the first position 220'; and applying the rotational transformation to the arrow 234.

The rotational transformation may allow for an arrow 234 to be projected on the first surface 232 that points towards the first portion 206 identified by the user input, regardless of the relative positions of the first portion 206 and the first surface 232 onto which the arrow 234 is projected. This may provide for clear feedback to be provided reliably to the user 204.

In some examples, the symbol 234 may comprise text (not shown), and determining the control information may comprise: determining a rotational transformation to orientate an axis of a line of the text parallel or at right angles to a vector from the third position 215' to the first position 220'; and applying the rotational transformation to the text (not shown).

The rotational transformation may allow for the text to be correctly orientated relative to the perspective of the user 204. This may allow for easier readability of the text by the user, and hence for clearer feedback to be provided for. The rotational transformation may orientate an axis of a line of the text parallel or at right angles to a vector from the third position to the first position for example when the text is to be read in a vertical or horizontal fashion, respectively, from the perspective of the user 204.

In some examples, the control information is for controlling the light source 210 to direct light 222 to outline a region 226 in real space 200 located at the second position 220. For example, as illustrated in FIGS. 6A to 6C, the light source 210 is controlled to direct light 222 to outline the region 226 located at the second position 220.

This may allow for clear and unambiguous identification, in the feedback, of a region 226' estimated to correspond to a region 226 identified in the user input, and/or an extent of that region 226'. This may alternatively or additionally allow for the clear and unambiguous identification, in the feedback, or a plurality of objects (not shown) estimated to correspond to a plurality of objects or a region containing a plurality of objects (not shown) identified in the user input.

In some examples, the control information may comprise information for controlling actuation of one or more actuatable mirrors of a light source 210 to direct a light beam 222 at or near the second position 220.

This may allow for a fast and/or energy efficient control of the direction of light 222 to the second position 220. For example, this may be as compared to moving an entire light source 210 as a whole in order to direct the light 222. The actuation of mirrors to steer or direct a light beam 222 may be fast enough to allow, as shown in FIG. 8C, the tracing out of a symbol 234, whether static or animated, by the beam 222 on a surface 232 that appears to the user 204 as though the symbol 234 is projected as onto the surface 232.

In some examples, the light source 210 may comprise a laser, and the light beam 222 may be a laser beam. The control information being for controlling the actuation of mirrors to direct the light beam 222 may allow, for example, a laser beam 222 to be used as the light directed at or near the second position 220. A laser beam 222 is bright and non-divergent, for example as compared to light from a non-coherent source such as a bulb. Use of a laser beam 222 may therefore allow for clearer feedback to be given in a precise way over a large range of distances from the light source 210. In some examples, the light source 210 comprise a green laser. A green laser may provide for the same apparent intensity whilst using significantly less power as compared to other colours of laser, for example as compared to a red laser.

In some examples, the method may further comprise: obtaining data representing a command, by the user 204, associated with the first portion 206 of the scene; and performing processing, based on the estimated first position 220', to enact the command. For example, the command may be to pick up the first portion or object 206, and the processing may be to move a robotic arm according to the estimated first position 220'. For example, this may allow for a command be enacted by the computer according to an estimate based on a user input and for which the user has been provided feedback via the control of the directing of light 222 at or near the second position 220. Accordingly, the occurrence of a command being issued by the user 204, and hence the command being enacted by the computer, that is associated with an incorrect interpretation by the computer of the user input can be reduced. An efficient user-machine interface or interaction can be provided for.

In some examples, the method may further comprise: obtaining data representing further user input 250 relating to an adjustment of the identified first portion 106 of the scene 201; estimating, based on the further user input 250 and based on the first position 220', an adjusted first position 220*a*' within the model 201' corresponding to the adjusted first portion 206*a* of the scene 201; determining adjusted control information for controlling a light source 210 to direct light at or near an adjusted second position 220*a* in real space corresponding to the adjusted first position 220*a*'; and outputting the adjusted control information to control a light source 210.

Providing for an adjustment of the user input, and accordingly adjusting the control information, may allow for an ongoing cycle of user input and feedback, and hence may allow for a more accurate and/or precise estimation of the first position 220' within the scene model 201 that corresponds to the first portion 206 identified by the user input. In some examples, the further user input may comprise an adjustment by the user of an outline 224 of a region 226 located at the second position 220, or may comprise an adjustment by the user of a specific one of a plurality of objects 206, 206*a* at or near the position at which light is controlled to be directed.

In some examples, the further user input 250 may identify a direction relative to the first portion 206 in real space and estimating the adjusted first position 200*a*' may comprise: determining a direction within the model corresponding to the direction in real space 200; and estimating the adjusted first position 220*a*' based on the determined direction within the model 201'.

Figure 9A:
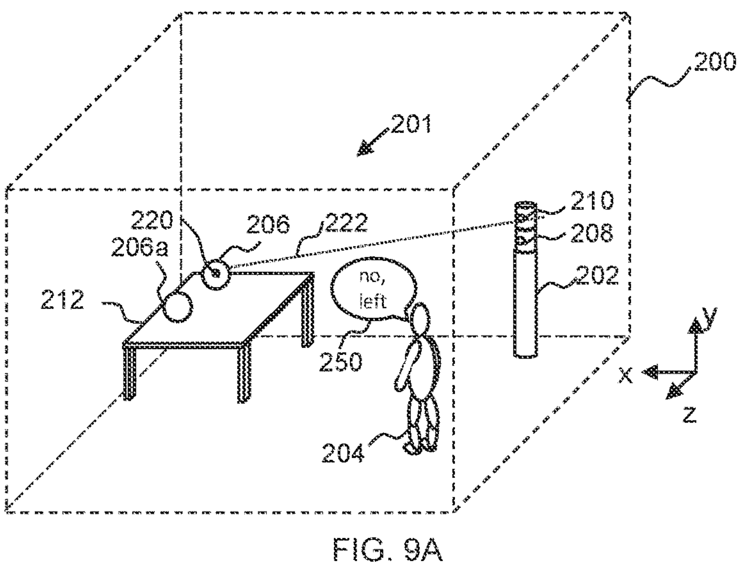
FIGS. 9A to 9C are schematic diagrams illustrating an implementation of the method according to a sixth example.
Figure 9B:
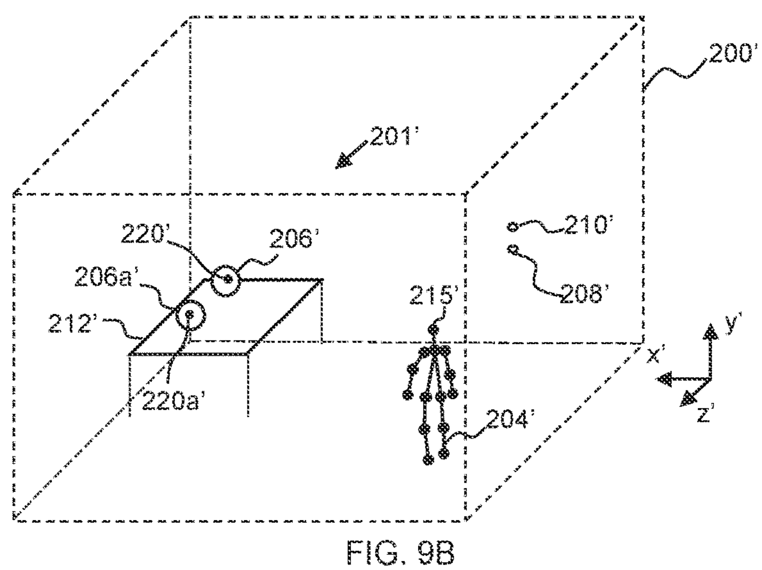
Figure 9C:
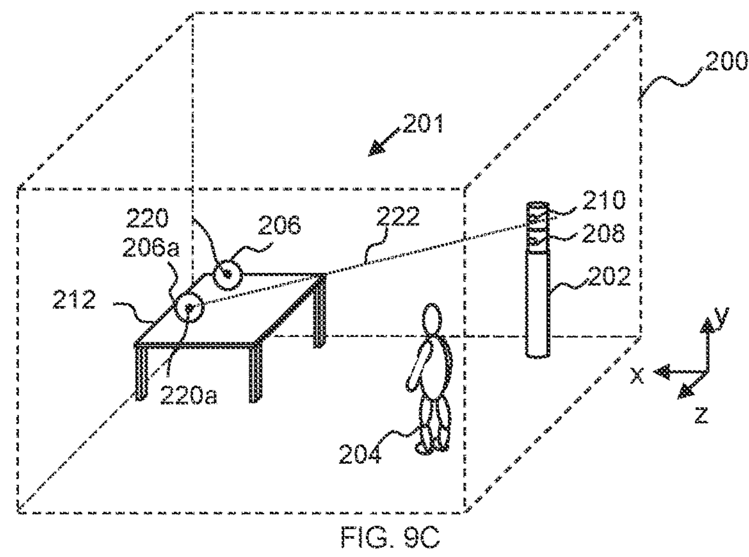

For example, as illustrated in FIGS. 9A to 9C, a scene 201 in real space may comprise two objects 206, 206*a* positioned side-by-side. The estimated first position 220' within the scene model 201 resulting from an initial user input corresponds to the object 206 on the right from the user's perspective. Accordingly, as shown in FIG. 9A, control instructions may be initially determined for controlling the light source 210 to direct light 222 at a second position 220 corresponding to the first position 220', i.e. at the object 206 on the right from the user's perspective. However, the intention of the user 204 may have been to instead identify the object 206*a* on the left. The user 204 knows from the light 222 being directed at the object 206 on the right that the estimation of the first position 220' does not correspond with the user's intention. The user may provide the further user input, for example, the user may utter 250 the words 'no, left'. As another example, the user may make a nudging gesture (not shown) to the left from the user's perspective. As another example, the further user input may comprise a combination of an utterance and a physical gesture (not shown). For example, the user 204 may utter the words 'no, that one' while pointing to the left, from the user's perspective, of the object 206 on the right, for example while pointing at the object 206*a* on the left from the user's perspective. In any case, from such further user input, the relative direction 'left' may be derived and the data representing the further user input data generated and obtained. As shown in FIG. 9B, based on this data a direction within the model corresponding to the direction in real space 200 may be determined and an adjusted first position 220*a*' may be estimated based thereon. For example, the first position 220' may be adjusted to correspond to that 200*a*' of the object 206*a*' on the left from the user's perspective, for example as determined from the model 204' of the user 204. This adjustment may be fed back to the user 204 via the appropriate adjustment of the control instructions. For example, as shown in FIG. 9C, the adjusted control instructions may control the light source 210 to direct light 222 at an adjusted second position 220*a* in real space 200 corresponding to the adjusted first position 220*a*' within the scene model 201'.

The adjustment of the first position 220' based on a direction relative to the first position 220' may provide for a precise, efficient, and/or intuitive adjustment mechanism. Alternatively or additionally, this may allow for an element of relative adjustment to be provided to an absolute estimation of the first position 220' and determination of the control instructions. This may allow for unambiguous feedback to be provided but nonetheless also for relative adjustments to be made if required.

Figure 10:
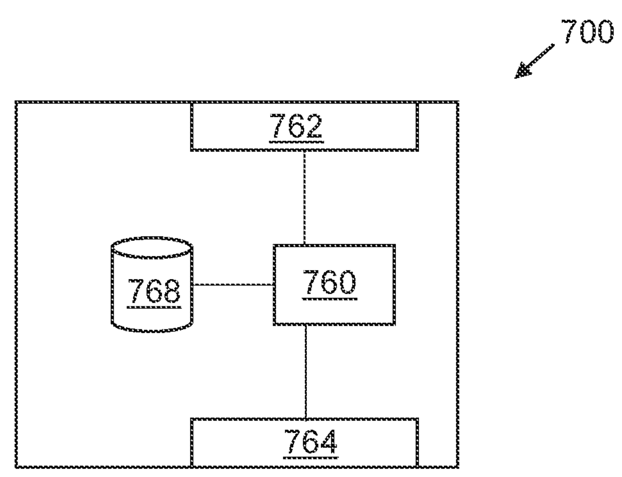
FIG. 10 is a schematic diagram illustrating an apparatus according to an example.

Referring to FIG. 10, there is illustrated an example apparatus 700 for providing feedback to a user input. The apparatus comprises a processing unit 760. The processing unit may be configured to perform the method according any one of the examples described with reference to FIGS. 1 to 9C.

The processing unit 760 is configured to obtain data representing a scene model 201' derived from scene data representing a scene 201 in real space 200. The data representing the scene model 201', the scene model 201', the scene data, the scene 201, the way in which the data representing the scene model is obtained, the way in which the scene model 201' is derived from the scene data, and/or the way in which the scene data is captured, may be the same as for any one of the examples described with reference to FIGS. 1 to 9C.

The processing unit 760 is configured to obtain data representing a user input identifying a first portion 206 of the scene 201 in real space 200. The data representing the user input, the first portion 206, the scene 201, the way in which the user input is captured, and/or the way in which the data representing the user input is obtained, may be the same as for any one of the examples described with reference to FIGS. 1 to 9C.

The processing unit 760 is configured to estimate, based on the user input data, a first position 220' within the scene model 201' corresponding to the first portion 206 of the scene 201. The first position 220' and/or the way in which the first position 220' is estimated may the same as for any one of the examples described with reference to FIGS. 1 to 9C.

The processing unit 760 is configured to determine control information for controlling a light source 210 to direct light 222 at or near a second position 220 in real space 200 corresponding to the first position 201 within the scene model 201; and output the control information to control a light source 210, thereby to provide for feedback to the user input. The control information, the way in which the control information is determined, the second position 220, the light source 210, and/or the way in which the control information controls the light source 210, may the same as for any one of the examples described above with reference to FIGS. 1 to 9C.

The apparatus 700 may allow for an efficient and effective user-computer interface or interaction to be provided.

In the example of FIG. 10, the apparatus 700 comprises a memory 768. The memory 768 may store control instructions which when executed by the processing unit 760 cause the processing unit 760 to perform the method of any one of the examples described with reference to FIGS. 1 to 9C.

In the example of FIG. 10, the apparatus comprises an input interface 762 and an output interface 764, each connected to the processing unit 760.

In some examples, the input interface 762 may be configured to receive the data representing a scene model and/or the data representing the user input. In some examples, the input interface may be configured to receive the scene data.

In some examples, the output interface 764 may be configured to output the control instructions to the light source 210.

In some examples, the apparatus 700 may comprise the light source 210, the light source 210 being configured to receive the output control information and direct light according to the control information.

This may provide that the feedback is provided by the apparatus 700 itself.

In some examples, the apparatus 700 may comprise a sensor configured to capture the user input and provide the data representing the user input to the processing unit, and/or a sensor configured to capture the scene data and provide the data representing the scene 201 to the processing unit.

This may provide that the apparatus itself determines the user input to which the feedback is provided. The sensor may be or comprise a camera, such as a depth camera, and/or a microphone.

Figure 11:
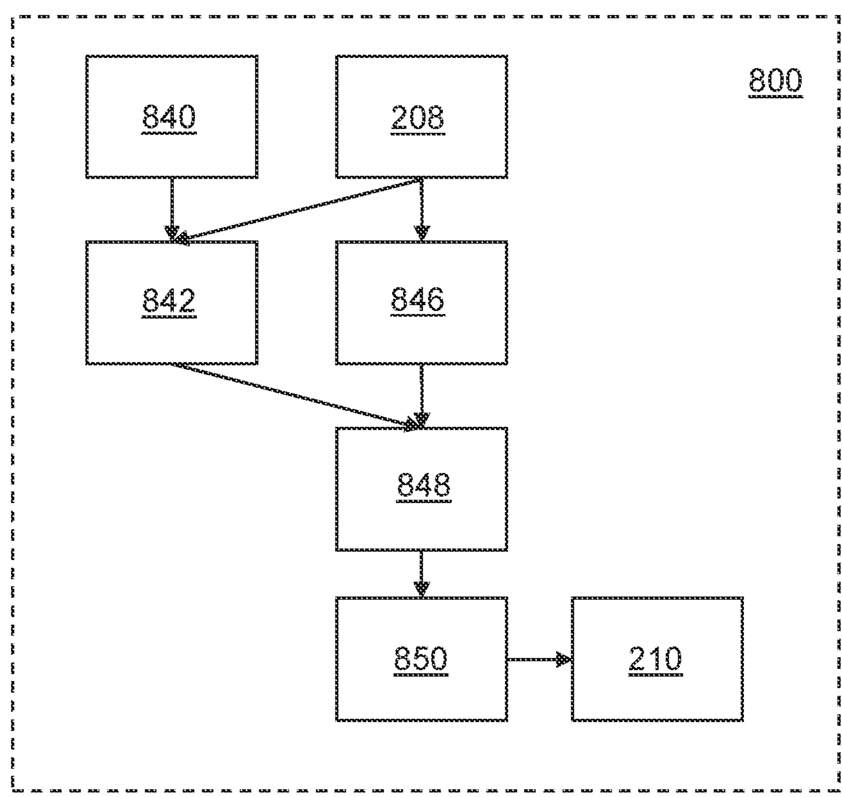
FIG. 11 is a schematic diagram illustrating an apparatus according to another example.

Referring to FIG. 11, there is illustrated functional units of an example apparatus 800. The apparatus 800 may be configured to perform the method of any one of the examples described above with reference to FIGS. 1 to 9C.

In this example, the apparatus 800 comprises a first sensor 208, a second sensor 840, a user input data unit 842, a scene model data unit 846, an estimation unit 848, a control instruction unit 850, and a light source 210. The user input data unit 842, the scene model data unit 846, the estimation unit 848, and the control instruction unit 850 may be implemented by a processor, for example the processing unit 760 described with reference to FIG. 10.

The first sensor 208 may be a camera such as a depth camera. The first sensor 208 may capture the scene data representing the scene 201 and provide this to the scene model data unit 846. For example, the first sensor 208 may capture images such as depth images of the scene 201 on the basis of which the scene model 201' may be constructed. The scene model data unit 846 may construct the scene model 201' thereby to obtain data representing the scene model 201.

The first sensor 208 may capture the user input data identifying the first portion 206 of the scene 201 in real space 200 and provide this the user input data unit 842. For example, the first sensor 208 may capture images such as depth images of the user 204 on the basis of which the user model 204' may be constructed. The user input data unit 842 may construct the user model 204' and derive a vector 218' associated therewith, thereby to obtain data representing the user input identifying a first portion 206 of the scene 201.

The first sensor 208 may be configured to capture, at a first time, the scene data to allow the user input data unit 842 to the obtain data representing the scene model 201, and then capture at a second, later, time the user input data to allow the user input data unit 842 to obtain the data representing the user input. It may be assumed that the scene 201 will not significantly change between the scene data being captured and the user input data being captured. For example, the orientation of the first sensor 208 relative to the apparatus 800 as a whole may be controllable so that, for example, at a first time the first sensor 208 is directed to the scene 201 to capture the scene data and at a second later time the first sensor 208 is directed to the user 204 to capture the user input data. This may allow for the first sensor 208 to be used when the user 204 is located outside of the field of view of the first sensor 208 when the first sensor is directed at the scene 201. This may provide for flexible user-computer interaction and/or may provide that multiple first sensors need not be used and hence reducing the cost, complexity and/or power consumption of the apparatus. In other examples, multiple such first sensors 208 may be provided, for example one configured to capture the scene data, and another to capture the user input data. For example, the multiple first sensors 208 may be controllable to be orientated independently of one another, for example such that one may be orientated to capture the scene data, and another may be orientated to capture the user input data.

The second sensor 840 may be a microphone or other sound capturing sensor. The second sensor 840 may capture the user input data identifying the first portion 206 of the scene 201 in real space 200 and provide this to the user input data unit 842. For example, the second sensor may capture the utterance 228 of the user 204 and produce sound data on the basis of which an identifier of the first portion of the scene 206 can be determined. The user input data unit 842 may determine the identifier of the first portion 206 of the scene 201, thereby to obtain data representing the use input identifying the first portion 206 of the scene 201.

The estimation unit 848 receives the data representing the scene model from the scene model data unit 846 and the data representing the user input from the user input data unit 842. The estimation unit 848 estimates, based on the user input data, a first position 220' within the scene model 201' corresponding to the first position 206 of the scene 201. This may be done as per any one of the examples described above with reference to FIGS. 1 to 9C.

The control instruction unit 850 determines control information for controlling the light source 210 to direct light at or near a second position 220 in real space corresponding to the first position 220' within the scene model 201' and outputs the control information to control the light source 210. For example, the control information may be determined and/or may be as per any of the examples described with reference to FIG. 1 to 9C.

The light source 210 receives the control information from the control instruction unit 850 and directs light 222 according to the control information. For example, the light source 210 may act on the control information as per any of the examples described with reference to FIG. 1 to 9C. In some examples, the light source 210 may comprise a laser, and the directed light may be a laser beam 222. In some examples, the light source 210 may comprise one or more actuatable mirrors configured to direct the light, such as the laser beam 222, according to the control instructions.

In some examples, the apparatus 700 of FIG. 10 and/or the apparatus 800 of FIG. 11 may be part of the apparatus 202 of any one of the examples described with reference to FIGS. 1 to 9C. For example, the apparatus 700 may form part of the computer circuitry of the apparatus 202 of FIGS. 1 to 9C.

In some examples, the apparatus 202 of FIGS. 1 to 9C, the apparatus 700 of FIG. 10 and/or the apparatus 800 of FIG. 11 may be, or form part of, a robot. A robot may be defined as a machine that carries out a task by physically moving. For example, the robot may be a domestic robot configured to perform actions based on a command of the user 204 referring to portions 206, 226 of the scene 201. In some examples, the robot may be capable of locomotion about the scene 201, for example to interact with the portions 206, 226 of the scene 201 to which the user 204 may refer in the user input. For example, the robot may be a robotic vacuum and/or comprise vacuum functionality, and may be capable of vacuuming portions 226 of the scene 201 to which the user may refer in the user input. Alternatively or additionally, the robot may be or comprise a controllable appendage, such as a robotic arm, that may be capable of interacting with, for example grasping and/or moving portions 206 of the scene 201 to which the user may refer in the user input.

The robot/apparatus may comprise the light source 210. Alternatively, the light source 210 may be located externally of the robot/apparatus, for example mounted within the scene 201. In either case, the robot/apparatus is configured to output the control information to control the light source 210 to direct light 222 at or near the second position 220, and thereby allows for feedback to be provided to the user input.

The above examples are to be understood as illustrative examples of the invention. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

The invention claimed is:

1. A computer implemented method for providing feedback to a user input, the method comprising:

obtaining data representing a scene model derived from scene data representing a scene in real space;

obtaining data representing a user input identifying a first portion of the scene in real space, wherein the data representing the user input includes data representing a physical gesture of the user, the user input data includes a vector or a sequence of vectors derived from a model of the user, and the vector or the sequence of vectors includes a shoulder-to-wrist vector or a head-to-wrist vector derived from the model of the user;

estimating, based on the user input data, a first position within the scene model corresponding to the first portion of the scene;

determining control information for controlling a light source to direct light at or near a second position in real space corresponding to the first position within the scene model; and outputting the control information to control a light source, thereby to provide for feedback to the user input.

2. The method according to claim 1, wherein estimating the first position comprises:

determining an object or region of the scene model intersected by the vector or encompassed by the sequence of vectors; and determining the first position based on a position of the object or region.

3. The method according to claim 1, wherein the user input data comprises data representing an utterance of the user.

4. The method according to claim 3, wherein the user input data comprises an identifier of an object or region derived from sound data representing the utterance of the user.

5. The method according to claim 4, wherein estimating the first position comprises:

mapping the identifier onto an object or region of the scene model; and determining a position of the object or region onto which the identifier is mapped as the first position.

6. The method according to claim 1, wherein the control information is determined based on data representing a third position within the scene model corresponding to a position of the user in real space.

7. The method according to claim 6, wherein the control information is for controlling the light source to direct light at a fourth position in real space, at or near the second position, corresponding to a fifth position within the model, at or near the first position, and between which fifth position and the third position there is a clear line-of sight.

8. The method according to claim 7, wherein determining the control information comprises:

when it is determined that there is a clear line-of-sight between the third position and the first position, determining control information for controlling the light source to direct light at the second position; and when it is determined that there is not a clear line-of-of sight between the third position and the first position, determining control information for controlling the light source to direct light at the fourth position.

9. The method according to claim 1, wherein the control information is for controlling the light source to project a symbol onto a first surface at or near the second position.

10. The method according to claim 9, wherein the symbol is an animated symbol.

11. The method according to claim 9, wherein determining the control information comprises:

determining an affine transformation to correct for an angle of incidence of a vector from a sixth position within the scene model to a second surface within the scene model, the sixth position corresponding to a position of the light source in real space, the second surface corresponding to the first surface in real space; and applying the affine transformation to the symbol to be projected onto the first surface.

12. The method according to claim 9, wherein the symbol comprises an arrow, and wherein determining the control information comprises:

determining a rotational transformation to orientate a point of the arrow towards the first position; and applying the rotational transformation to the arrow.

13. The method according to claim 9, wherein the symbol comprises text, and wherein determining the control information comprises:

determining a rotational transformation to orientate an axis of a line of the text parallel or at right angles to a vector from the third position to the first position; and applying the rotational transformation to the text.

14. The method according to claim 1, wherein the control information is for controlling the light source to direct light to outline a region in real space located at the second position.

15. The method according to claim 1, wherein the control information comprises information for controlling actuation of one or more actuatable mirrors of a light source to direct a light beam at or near the second position.

16. The method according to claim 1, wherein the method further comprises:

obtaining data representing further user input relating to an adjustment of the identified first portion of the scene;

estimating, based on the further user input and based on the first position, an adjusted first position within the model corresponding to the adjusted first portion of the scene;

determining adjusted control information for controlling a light source to direct light at or near an adjusted second position in real space corresponding to the adjusted first position; and outputting the adjusted control information.

17. The method according to claim 16, wherein the further user input identifies a direction relative to the first portion in real space and wherein estimating the adjusted first position comprises: determining a direction within the model corresponding to the direction in real space; and estimating the adjusted first position based on the determined direction within the model.

18. An apparatus for providing feedback to a user input, the apparatus comprising a processing unit configured to:

obtain data representing a scene model derived from scene data representing a scene in real space;

obtain data representing a user input identifying a first portion of the scene in real space, wherein the data representing the user input includes data representing a physical gesture of the user, the user input data includes a vector or a sequence of vectors derived from a model of the user, and the vector or the sequence of vectors includes a shoulder-to-wrist vector or a head-to-wrist vector derived from the model of the user;

estimate, based on the user input data, a first position within the scene model corresponding to the first portion of the scene;

determine control information for controlling a light source to direct light at or near a second position in real space corresponding to the first position within the scene model; and output the control information to control a light source, thereby to provide for feedback to the user input.

19. The apparatus according to claim 18, wherein the apparatus comprises the light source, wherein the light source is configured to receive the output control information and direct light according to the control information.

20. The apparatus according to claim 18, wherein the apparatus comprises a sensor configured to capture the user input and provide the data representing the user input to the processing unit.

21. The apparatus according to claim 18, wherein the apparatus is a robot.

* * * * *